(12) United States Patent  (10) Patent No.: US 8,715,617 B2
Genkin et al.  (45) Date of Patent: May 6, 2014

(54) HYDROGEN PRODUCTION PROCESS WITH LOW $CO_2$ EMISSIONS

(75) Inventors: Eugene S. Genkin, Allentown, PA (US); Patricia Kentosh Hershman, Allentown, PA (US); Edward Landis Weist, Jr., Macungie, PA (US); Jianguo Xu, Wrightstown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 127 days.

(21) Appl. No.: 13/421,305

(22) Filed: Mar. 15, 2012

(65) Prior Publication Data

US 2013/0243686 A1  Sep. 19, 2013

(51) Int. Cl.
 *C01B 3/26* (2006.01)
 *C01B 31/20* (2006.01)

(52) U.S. Cl.
 USPC .............. 423/652; 95/96; 95/97; 423/437.1; 423/653; 423/654

(58) Field of Classification Search
 USPC .............. 423/437.1, 652, 653, 654; 95/96, 97
 See application file for complete search history.

(56) References Cited

U.S. PATENT DOCUMENTS

| | | |
|---|---|---|
| 4,077,779 A | 3/1978 | Sircar et al. |
| 4,171,206 A | 10/1979 | Sircar |
| 4,333,744 A | 6/1982 | Fuderer |
| 4,512,780 A | 4/1985 | Fuderer |
| 4,705,541 A | 11/1987 | Sircar |
| 4,723,966 A | 2/1988 | Fuderer |
| 4,861,351 A | 8/1989 | Nicholas et al. |
| 4,913,709 A | 4/1990 | Kumar |
| 5,753,010 A | 5/1998 | Sircar et al. |
| 5,980,857 A | 11/1999 | Kapoor et al. |
| 6,379,431 B1 | 4/2002 | Xu et al. |
| 6,565,628 B2 | 5/2003 | Xu et al. |
| 7,306,651 B2 | 12/2007 | Cieutat et al. |
| 7,491,260 B2 | 2/2009 | Herb et al. |
| 7,892,328 B2 | 2/2011 | Nakao et al. |
| 8,137,422 B2 * | 3/2012 | Licht et al. ................. 48/197 R |
| 8,460,630 B2 * | 6/2013 | Niitsuma et al. ........... 423/437.1 |
| 2005/0003248 A1 | 1/2005 | Matsuda et al. |
| 2010/0000408 A1 | 1/2010 | Haruma et al. |
| 2011/0005391 A1* | 1/2011 | Cho et al. ......................... 95/97 |
| 2013/0011323 A1* | 1/2013 | Grover ....................... 423/437.1 |
| 2013/0239807 A1 | 9/2013 | Weist, Jr. et al. |

FOREIGN PATENT DOCUMENTS

EP  2407227 A1  1/2012

* cited by examiner

*Primary Examiner* — Wayne Langel
(74) *Attorney, Agent, or Firm* — Bryan C. Hoke, Jr.

(57) ABSTRACT

A hydrogen production process wherein steam and a hydrocarbon feed is reacted in a prereformer, the prereformed intermediate is further reacted in an oxygen-based reformer, the reformate is shifted and then separated by a pressure swing adsorber to form a $H_2$ product stream and a tail gas, a first portion of the tail gas is recycled to the prereformer and/or the oxygen-based reformer, and a second portion of the tail gas is recycled to the pressure swing adsorber.

16 Claims, 22 Drawing Sheets

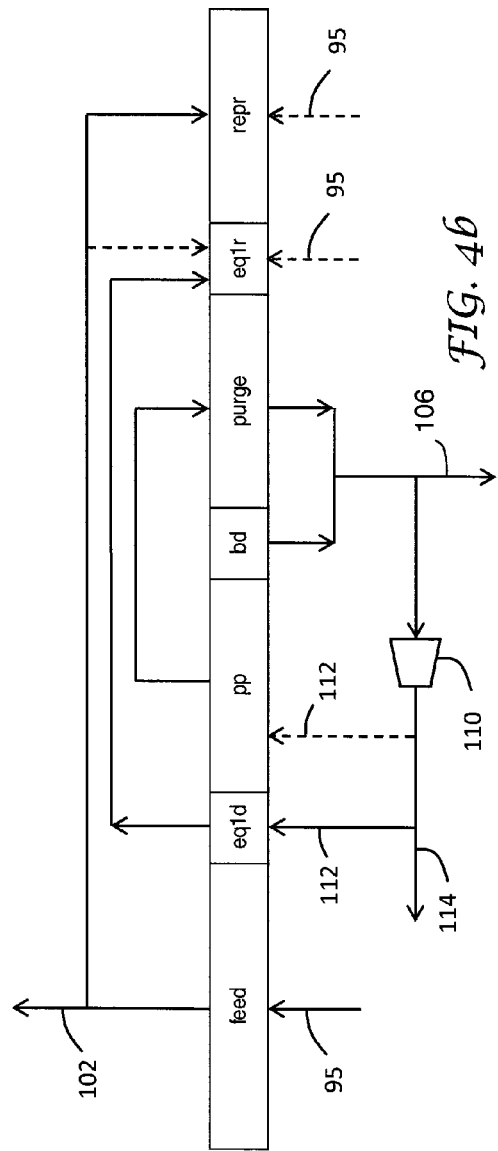

| feed | eq1d | pp | eq2d | bd | purge | eq2r | eq1r | repr | | |
|------|------|------|------|------|------|------|------|------|------|------|
| eq1r | repr | | feed | | | eq2r | eq1d | bd | purge | eq2d |
| bd | purge | eq2d | repr | | | | | feed | | pp |
| eq1d | pp | eq2r | eq1r | | | repr | | | feed | |

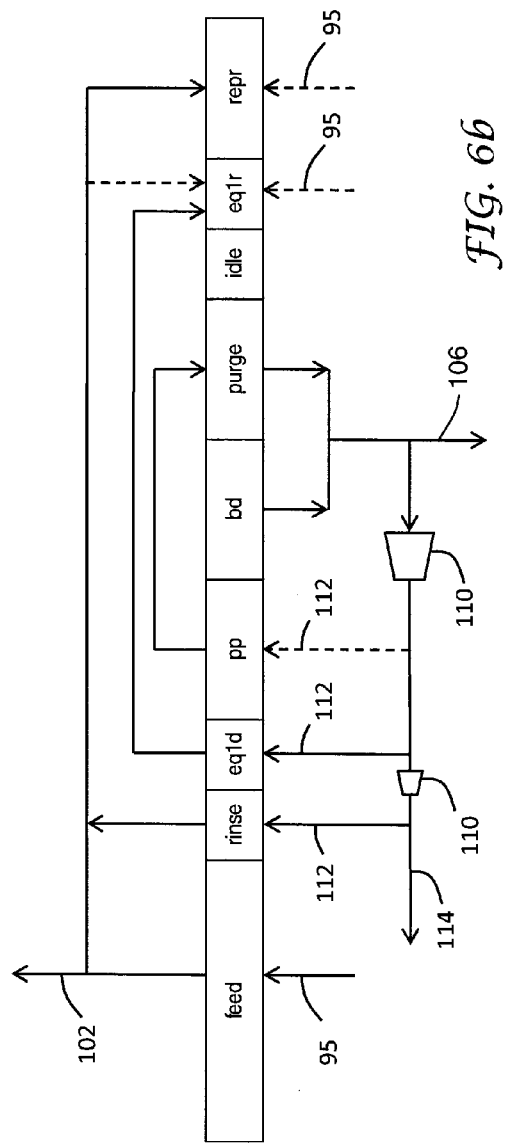

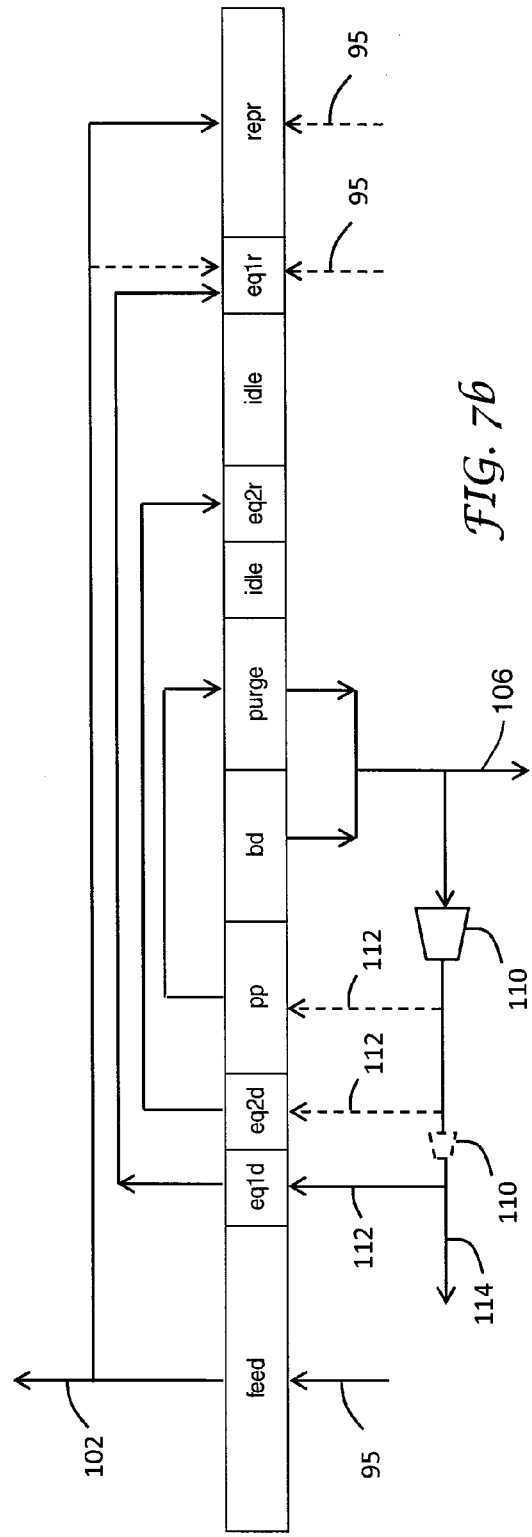

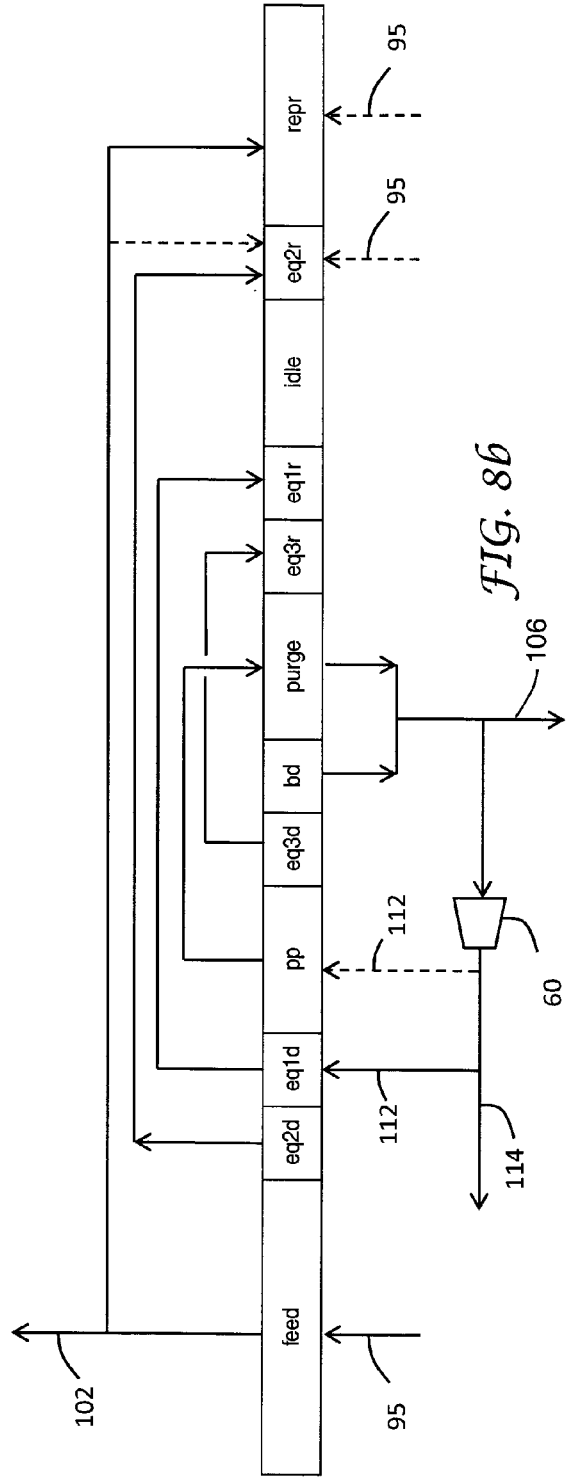

HYDROGEN PRODUCTION PROCESS WITH LOW $CO_2$ EMISSIONS

CROSS-REFERENCE TO RELATED APPLICATIONS

This patent application is related to U.S. patent application Ser. No. 13/421,094, entitled "Pressure Swing Adsorption Process," contemporaneously filed on 15 Mar. 2012.

BACKGROUND

Steam/hydrocarbon reforming with oxygen-based reforming methods such as autothermal reforming (ATR) or $O_2$ secondary reforming are known and generally used for CO and synthesis gas (syngas) production. Autothermal reforming and $O_2$ secondary reforming require industrial grade oxygen. Industry desires to reduce $O_2$ consumption for autothermal reforming and $O_2$ secondary reforming.

Oxygen-based reforming methods can achieve relatively high carbon capture compared to conventional steam/hydrocarbon reforming methods without the use of oxygen, since a majority of the $CO_2$ produced in the oxygen-based methods can be recovered from the high pressure syngas stream using conventional acid gas removal operations. Industry desires to capture $CO_2$ and/or limit $CO_2$ emissions from $H_2$ production facilities.

Hydrogen production using autothermal reforming or oxygen secondary reforming typically use methanation and cannot achieve a hydrogen product purity greater than about 98.5 vol. %. Industry desires to produce $H_2$ at purities suitable for $H_2$ pipelines from autothermal reforming and oxygen secondary reforming. To generate $H_2$ purities required for $H_2$ pipelines, the product from autothermal reforming or $O_2$ secondary reforming may be processed in a pressure swing adsorber (PSA). However, use of a PSA results in a considerable loss of $H_2$ via the PSA tail gas stream. And unlike conventional steam methane reforming where PSA tail gas is advantageously used as a fuel, suitable use for the excess PSA tail gas stream must be found for autothermal reforming and oxygen secondary reforming. Industry desires improved hydrogen production efficiency from autothermal and secondary oxygen reforming when producing high purity $H_2$.

Industry desires to produce $H_2$ for pipeline use, without the need for a customer for coproduced steam. Industry desires the option to produce $H_2$ with limited or zero steam export.

The present process addresses these industry desires.

BRIEF SUMMARY

The present invention relates to a hydrogen production process. There are several aspects of the process as outlined below.

Aspect 1. A hydrogen production process comprising:
introducing reactants comprising steam and a hydrocarbon feed into a first reactor wherein the hydrocarbon feed comprises methane and at least one C2-C5 hydrocarbon, reacting the reactants in the presence of a reforming catalyst under reaction conditions sufficient to form a reformate comprising $H_2$, CO, and unreacted methane and steam, and withdrawing the reformate from the first reactor;
introducing an oxygen-containing stream and the reformate from the first reactor into a second reactor, reacting the oxygen and the reformate in the presence of a second reforming catalyst under reaction conditions sufficient to form additional $H_2$ and CO in the reformate;
recovering heat from the reformate from the second reactor thereby cooling the reformate;
reacting the cooled reformate in the presence of a shift catalyst under reaction conditions sufficient to shift the reformate to form additional $H_2$ in the reformate;
recovering heat from the shifted reformate thereby cooling the shifted reformate;
removing $H_2O$ from the shifted reformate to form a water-depleted reformate;
separating the water-depleted reformate into a $CO_2$ product stream and a pressure swing adsorber feed stream comprising $H_2$ and secondary gas components, the secondary gas components comprising CO, $N_2$, Ar, and $CH_4$;
separating the pressure swing adsorber feed stream in a plurality of at least 4 pressure swing adsorption beds, each adsorption bed containing an adsorbent selective for the secondary gas components thereby forming a $H_2$ product stream and a pressure swing adsorption tail gas stream;
introducing a first portion of the tail gas stream into at least one of the first reactor, and the second reactor; and
introducing a second portion of the tail gas stream into at least one of the plurality of pressure swing adsorption beds.

Aspect 2. The process of aspect 1 wherein the molar flow rate of the first portion of the tail gas stream is 15% to 80% or 30% to 40% of the molar flow rate of the tail gas stream.

Aspect 3. The process of aspect 1 or aspect 2 wherein the molar flow rate of the second portion of the tail gas stream is 5% to 80% or 40% to 55% of the molar flow rate of the tail gas stream.

Aspect 4. The process of any one of aspects 1 to 3 wherein a third portion of the tail gas stream is combusted in a boiler thereby forming combustion products and generating heat for forming a portion of the steam in the reactants from feed water, the portion of the steam formed by indirect heat exchange between the feed water and the combustion products.

Aspect 5. The process of aspect 4 wherein the molar flow rate of the third portion of the tail gas stream is 1% to 25% of the molar flow rate of the tail gas stream.

Aspect 6. The process of any one of aspects 1 to 5 wherein the step of recovering heat from the reformate from the second reactor comprises heating the reformate from the first reactor by indirect heat exchange between the reformate from the first reactor and the reformate from the second reactor prior to introducing the reformate from the first reactor into the second reactor.

Aspect 7. The process of any one of aspects 1 to 6 wherein the step of recovering heat from the reformate from the second reactor comprises heating a hydrocarbon feedstock by indirect heat exchange, wherein the hydrocarbon feed is formed from the heated hydrocarbon feedstock.

Aspect 8. The process of any one of aspects 1 to 7 wherein a portion of the steam in the reactants is generated in the step of recovering heat from the reformate from the second reactor, the portion of the steam formed from feed water, the portion of the steam formed by indirect heat exchange between the feed water and the reformate from the second reactor.

Aspect 9. The process of any one of aspects 1 to 8 wherein a portion of the steam in the reactants is generated by direct heat transfer between the hydrocarbon feed and feed water and the step of recovering heat from the reformate from the second reactor comprises heating the reactants by indirect heat exchange with the reformate from the second reactor prior to introducing the reactants into the first reactor.

Aspect 10. The process of any one of aspects 1 to 9 wherein the water-depleted reformate is separated by liquid absorption.

Aspect 11. The process of any one of aspects 1 to 10 wherein the water-depleted reformate is separated by pressure swing adsorption.

Aspect 12. The process of any one of aspects 1 to 11 wherein the step of separating the pressure swing adsorber feed stream comprises subjecting each of the plurality of adsorption beds to a repetitive cycle, the repetitive cycle comprising, in sequence, a feed step, a first pressure decreasing equalization step, a provide purge step, a blowdown step, a purge step, a first pressure increasing equalization step, and a repressurization step, wherein:

the feed step comprises introducing the pressure swing adsorber feed stream at a feed pressure ranging from 1.0 MPa to 7.0 MPa into an adsorption bed undergoing the feed step and adsorbing the secondary gas components on the adsorbent in the adsorption bed undergoing the feed step while simultaneously withdrawing the $H_2$ product stream from the adsorption bed undergoing the feed step;

the first pressure decreasing equalization step comprises co-currently withdrawing a pressure equalization gas from an adsorption bed undergoing the first pressure decreasing equalization step, and passing the pressure equalization gas to an adsorption bed undergoing the first pressure increasing equalization step thereby equalizing the pressure between the adsorption bed undergoing the first pressure decreasing equalization step and the adsorption bed undergoing the first pressure increasing equalization step;

the provide purge step comprises co-currently withdrawing a purge gas from an adsorption bed undergoing the provide purge step, and passing the purge gas from the adsorption bed undergoing the provide purge step to an adsorption bed undergoing the purge step;

the blowdown step comprises counter-currently withdrawing a blowdown gas from an adsorption bed undergoing the blowdown step, the blowdown gas having a concentration of the secondary gas components that is higher than the concentration of the secondary gas components in the feed gas mixture;

the purge step comprises counter-currently introducing the purge gas from the adsorption bed undergoing the provide purge step, into an adsorption bed undergoing the purge step and counter-currently withdrawing a purge gas effluent from the adsorption bed undergoing the purge step, the purge gas effluent having a concentration of the secondary gas components that is higher than the concentration of the secondary gas components in the feed gas mixture;

the first pressure increasing equalization step comprises counter-currently introducing the pressure equalization gas from the adsorption bed undergoing the first pressure decreasing equalization step into the adsorption bed undergoing the first pressure increasing equalization step; and the repressurization step comprises increasing the pressure in an adsorption bed undergoing the repressurization step until the adsorption bed undergoing the repressurization step is substantially at the feed gas pressure, by at least one of (i) co-currently introducing the feed gas mixture into the adsorption bed undergoing the repressurization step, and (ii) counter-currently introducing a portion of the product gas from the adsorption bed undergoing the feed step into the adsorption bed undergoing the repressurization step;

wherein the tail gas stream comprises the blowdown gas and the purge gas effluent.

Aspect 13. The process of aspect 12 wherein the step of introducing the second portion of the tail gas stream comprises co-currently introducing the second portion of the tail gas stream into a pressure swing adsorption bed undergoing the feed step.

Aspect 14. The process of aspect 12 wherein the step of introducing the second portion of the tail gas stream comprises co-currently introducing the second portion of the tail gas stream into a pressure swing adsorption bed undergoing the first pressure decreasing equalization step simultaneously with the withdrawing of the pressure equalization gas.

Aspect 15. The process of aspect 12 wherein the repetitive cycle further comprises a rinse step, wherein the rinse step is after the feed step and before the first pressure decreasing equalization step in the repetitive cycle, wherein the step of introducing the second portion of the tail gas stream comprises co-currently introducing the second portion of the tail gas stream into a pressure swing adsorption bed undergoing the rinse step as a rinse gas while simultaneously co-currently withdrawing a rinse gas effluent from the adsorption bed undergoing the rinse step.

Aspect 16. The process of aspect 12 wherein the step of introducing the second portion of the tail gas stream comprises co-currently introducing the second portion of the tail gas stream into a pressure swing adsorption bed undergoing the provide purge step.

BRIEF DESCRIPTION OF SEVERAL VIEWS OF THE DRAWINGS

FIG. 4a is a cycle chart for a 4 adsorption bed cycle having a single pressure equalization step. FIG. 4b is a schematic illustrating the direction of gas flows for the cycle chart of FIG. 4a.

FIG. 5a is a cycle chart for a 4 adsorption bed cycle having two pressure equalization steps. FIG. 5b is a schematic illustrating the direction of gas flows for the cycle chart of FIG. 5a.

FIG. 6a is a cycle chart for a 4 adsorption bed cycle having a rinse step and one pressure equalization step. FIG. 6b is a schematic illustrating the direction of gas flows for the cycle chart of FIG. 6a.

FIG. 7a is a cycle chart for a 5 adsorption bed cycle having two pressure equalization steps. FIG. 7b is a schematic illustrating the direction of gas flows for the cycle chart of FIG. 7a.

FIG. 8a is a cycle chart for a 5 adsorption bed cycle having three pressure equalization steps. FIG. 8b is a schematic illustrating the direction of gas flows for the cycle chart of FIG. 8a.

FIG. 9a is a cycle chart for a 5 adsorption bed cycle having two pressure equalization steps and a rinse step. FIG. 9b is a schematic illustrating the direction of gas flows for the cycle chart of FIG. 9a.

FIG. 10a is a cycle chart for a 5 adsorption bed cycle having three pressure equalization steps. FIG. 10b is a schematic illustrating the direction of gas flows for the cycle chart of FIG. 10a.

FIG. 11a is a cycle chart for a 6 adsorption bed cycle having three pressure equalization steps. FIG. 11b is a schematic illustrating the direction of gas flows for the cycle chart of FIG. 11a.

FIG. 12a is a cycle chart for a 6 adsorption bed cycle having two pressure equalization steps. FIG. 12b is a schematic illustrating the direction of gas flows for the cycle chart of FIG. 12a.

FIG. 13a is a cycle chart for a 6 adsorption bed cycle having two pressure equalization steps and a rinse step. FIG. 13b is a schematic illustrating the direction of gas flows for the cycle chart of FIG. 13a.

FIG. 14a is a cycle chart for an 8 adsorption bed cycle having three pressure equalization steps. FIG. 14b is a schematic illustrating the direction of gas flows for the cycle chart of FIG. 14a.

FIG. 15a is a cycle chart for a 10 adsorption bed cycle having four pressure equalization steps. FIG. 15b is a schematic illustrating the direction of gas flows for the cycle chart of FIG. 15a.

FIG. 16a is a cycle chart for a 10 adsorption bed cycle having four pressure equalization steps. FIG. 16b is a schematic illustrating the direction of gas flows for the cycle chart of FIG. 16a.

FIG. 17a is a cycle chart for a 10 adsorption bed cycle having three pressure equalization steps and a rinse step. FIG. 17b is a schematic illustrating the direction of gas flows for the cycle chart of FIG. 17a.

FIG. 18a is a cycle chart for a 12 adsorption bed cycle having five pressure equalization steps. FIG. 18b is a schematic illustrating the direction of gas flows for the cycle chart of FIG. 18a.

FIG. 19a is a cycle chart for a 12 adsorption bed cycle having five pressure equalization steps. FIG. 19b is a schematic illustrating the direction of gas flows for the cycle chart of FIG. 19a.

FIG. 20a is a cycle chart for a 12 adsorption bed cycle having five pressure equalization steps. FIG. 20b is a schematic illustrating the direction of gas flows for the cycle chart of FIG. 20a.

DETAILED DESCRIPTION

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity. The term "and/or" placed between the last two entities of a list of 3 or more entities means at least one of the entities in the list.

The phrase "at least a portion" means "a portion or all." The at least a portion of a stream may have the same composition as the stream from which it is derived. The at least a portion of a stream may include specific components of the stream from which it is derived.

As used herein, concentration percentages are mole percent, unless specifically stated otherwise.

Pressures are absolute pressures unless specifically indicated to be gauge pressures.

The present process relates to a process for producing hydrogen. The process will be described with reference to FIGS. 1 and 2, wherein like reference numbers refer to like elements throughout the drawings.

The process comprises introducing reactants comprising steam and a hydrocarbon feed 47 into reactor 10, reacting the reactants in the presence of a reforming catalyst under reaction conditions sufficient to form a reformate comprising $H_2$, CO, and unreacted hydrocarbon feed and steam, and withdrawing the reformate from reactor 10.

The steam and hydrocarbon feed may be mixed and introduced together into the reactor 10 as a so-called mixed feed.

The hydrocarbon feed comprises $CH_4$ and one or more C2-C5 hydrocarbons. The C2-C5 hydrocarbons may be alkanes, alkenes, etc. that have 2 to 5 carbon atoms. The hydrocarbon feed may be formed from any suitable hydrocarbon feedstock known for producing hydrogen, for example, natural gas. Natural gas comprises methane and typically some C2-C5 hydrocarbons.

Figure 1:
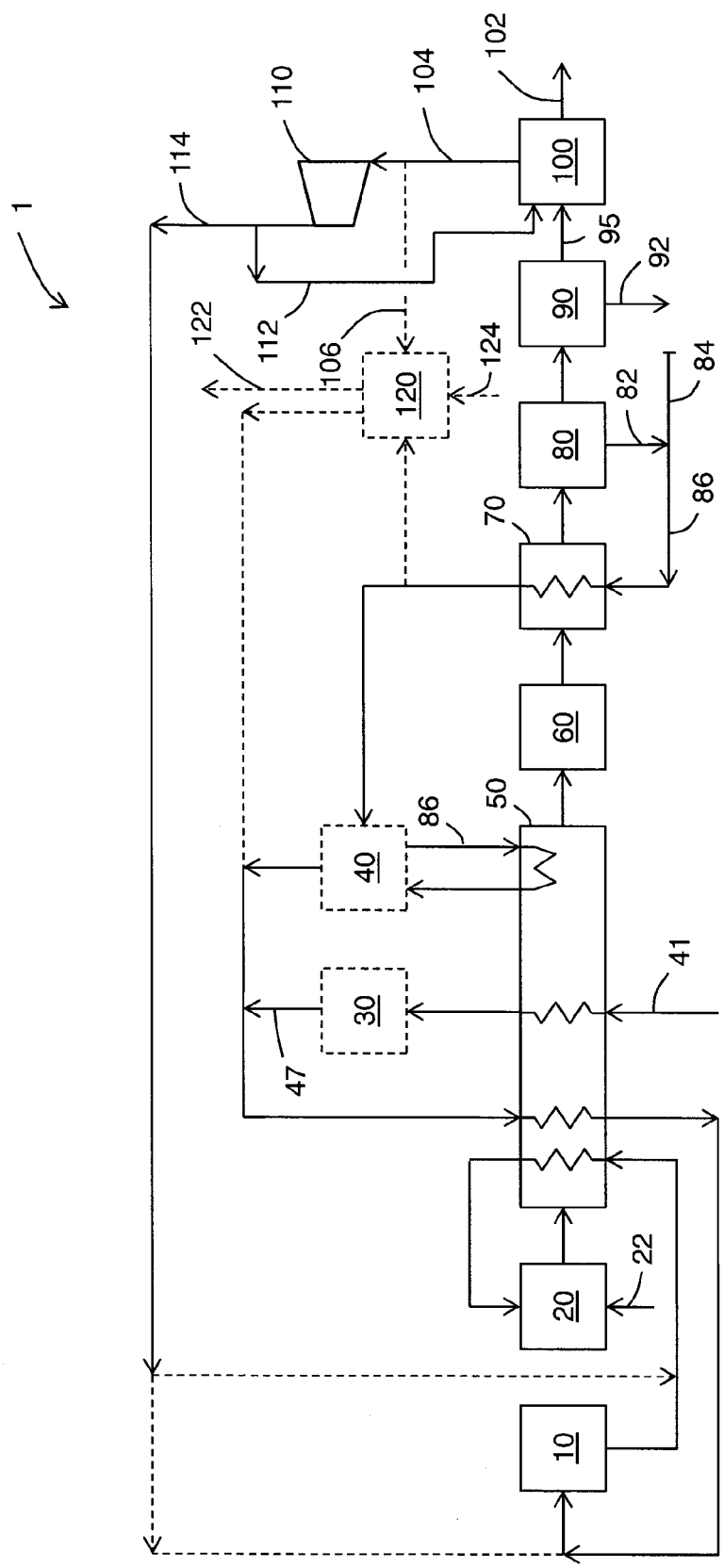
FIG. 1 is a process flow diagram for a process for producing hydrogen.
Figure 2:
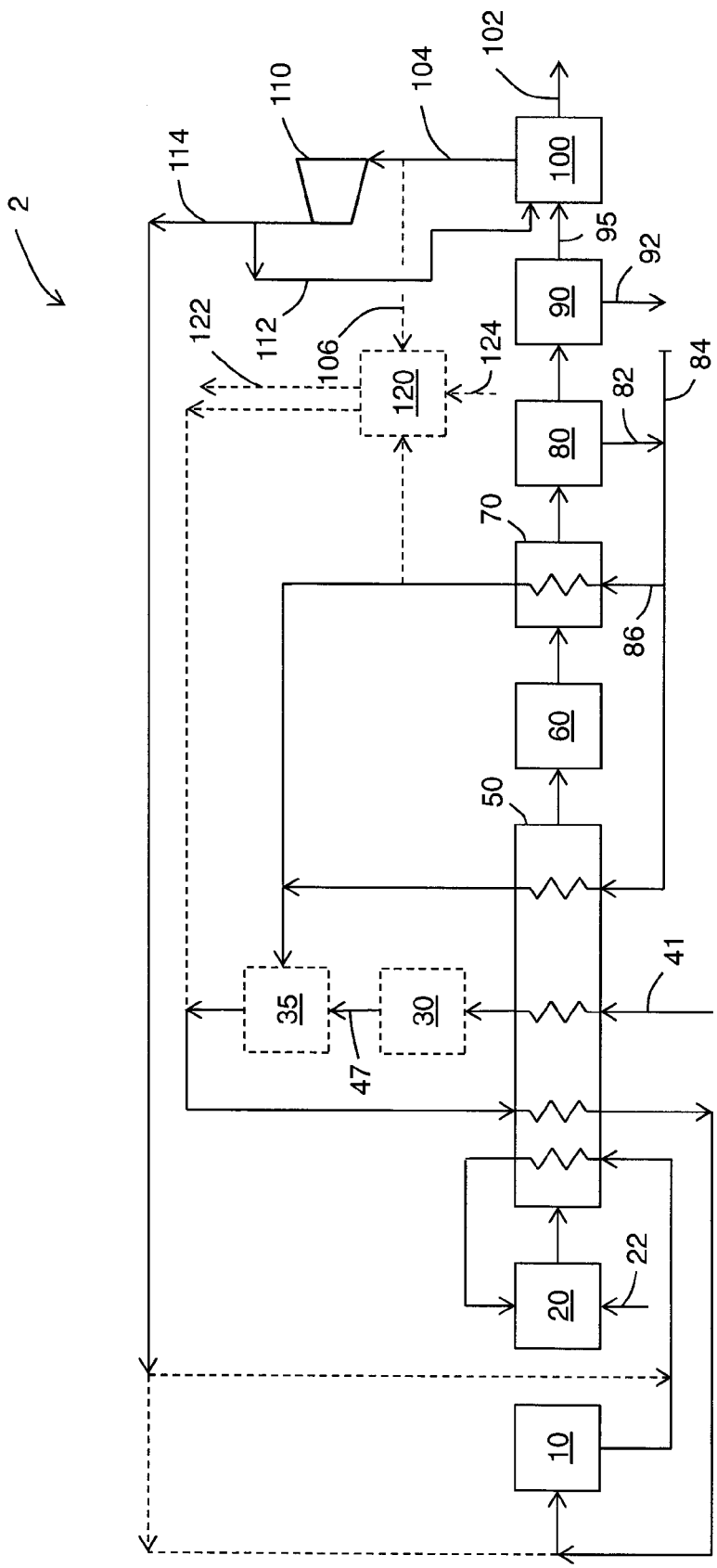
FIG. 2 is a process flow diagram for a process for producing hydrogen.

The hydrocarbon feed may be "pretreated" in desulfurizer 30 to remove sulfur components prior to introducing into the reactor 10 as shown in FIGS. 1 and 2. Sulfur compounds are removed from the feed to the reactors because sulfur compounds may poison the catalyst in the reactors. The hydrocarbon feed may also be pretreated to hydrogenate olefins to produce saturated hydrocarbons.

Reactor 10 is a so-called "prereformer." The prereformer may be adiabatic or non-adiabatic.

A reforming catalyst is any catalyst that promotes the reforming reaction.

The reforming catalyst in reactor 10 may be any suitable prereforming catalyst known in the art. Catalysts for prereforming are commercially available. Pre-reforming catalyst may comprise at least one metal selected from the group consisting of nickel, cobalt, platinum, palladium, rhodium, ruthenium, iridium, and mixtures thereof. Pre-reforming catalysts generally have high nickel content, typically greater than 40 weight % for an adiabatic pre-reformer. In the case when reactor 10 is a non-adiabatic pre-reformer, a conventional reforming catalyst with moderate nickel content of about 15 to 20 weight % may be used. Reactor 10 may be used to primarily react the higher hydrocarbons, e.g., the C2-C5 hydrocarbons. Higher hydrocarbons have a greater tendency to crack and form carbon on the catalyst in a reactor.

The reaction conditions in reactor 10 include a temperature ranging from 430° C. to 570° C. and a pressure ranging from 0.7 to 9 MPa.

The process further comprises introducing oxygen-containing stream 22 and the reformate from reactor 10 into reactor 20, reacting the oxygen from the oxygen-containing stream and the reformate in the presence of a second reforming catalyst under reaction conditions sufficient to form additional $H_2$ and CO in the reformate.

The reformate from the first reactor and the oxygen may be preferably introduced as separate streams into the second reactor.

The oxygen-containing stream 22 may be industrial grade oxygen. The oxygen-containing stream 22 may have an oxygen concentration of 85% to 100% oxygen. The oxygen may be provided from any known oxygen source, for example, a cryogenic air separation plant, or pressure swing adsorption air separation plant.

Reactor 20 is a reformer often called an "autothermal reformer" abbreviated "ATR." Reactor 20 may also be called an oxygen secondary reformer. Autothermal reformers are well-known in the art.

The second reforming catalyst may be any suitable reforming catalyst known in the art for use in an autothermal reformer. The second reforming catalyst may be the same as the reforming catalyst used in reactor 10, but typically will be a different reforming catalyst having a lower nickel content (typically less than about 10 weight %) than the reforming catalyst used in the reactor 10.

The reaction conditions in the reactor 20 include a temperature ranging from 940 to 1040° C. and a pressure ranging from 0.7 to 9 MPa.

The process further comprises recovering heat from the reformate from reactor 20 thereby cooling the reformate and forming a cooled reformate.

Reformate from reactor 20 is passed to heat recovery train 50 where heat is recovered from the reformate from reactor 20.

In case reactor 10 is a non-adiabatic prereformer, the step of recovering heat from the reformate from reactor 20 may comprise heating the reactants in reactor 10 by indirect heat exchange (not shown) between the reactants and the reformate from reactor 20. Reactor 10 may be coupled (not shown) with heat recovery train 50 such that heat may be recovered from the reformate from reactor 20 and provide heat for reactor 10.

In case reactor 10 is an adiabatic prereformer, the step of recovering heat from the reformate from reactor 20 may comprise heating the reformate from reactor 10 by indirect heat exchange between the reformate from reactor 10 and the reformate from reactor 20 prior to introducing the reformate from reactor 10 into reactor 20. As shown in FIGS. 1 and 2, reformate from reactor 10 may be passed to heat recovery train 50 where indirect heat exchange between the reformate from reactor 10 and the reformate from reactor 20 is realized.

The step of recovering heat from the reformate from reactor 20 may comprise heating a hydrocarbon feedstock by indirect heat exchange. As shown in FIGS. 1 and 2, hydrocarbon feedstock 41 may be heated in heat recovery train 50 by indirect heat exchange with the reformate from reactor 20. Hydrocarbon feed 47 is formed from the heated hydrocarbon feedstock.

As shown in FIG. 1, the step of recovering heat from the reformate from reactor 20 may comprise generating steam by indirect heat exchange between feed water and reformate from reactor 20 in heat recovery train 50. Heated feed water from heat recovery train 50 is passed to steam drum 40 and steam is withdrawn and mixed with the hydrocarbon feed to form a mixed feed for reacting in reactor 10. The mixed feed may be heated in heat recovery train 50 before being passed to reactor 10 as part of the step of recovering heat from the reformate from reactor 20.

Feed water used to form steam is often called "boiler feed water." Boiler feed water is typically treated and conditioned to avoid corrosion and/or scaling in the process equipment.

As shown in FIG. 2, steam for reactor 10 may be generated by direct heat exchange between the hydrocarbon feed 47 and feed water in saturator 35. The hydrocarbon feed, after treatment in desulfurizer 30 is passed to saturator 35 to form a mixed feed comprising the hydrocarbon feed and steam, and the mixed feed may be heated in the heat recovery train 50 before being passed to reactor 10 as part of the step of recovering heat from the reformate from reactor 20.

Any suitable sequence of heat exchange between the various streams within heat recovery train 50 may be realized and may be optimized for overall energy efficiency.

The process further comprises reacting the cooled reformate in the presence of a shift catalyst under reaction conditions sufficient to shift the reformate to form additional $H_2$ in the reformate. As shown in FIGS. 1 and 2, reformate from reactor 20 that has been cooled in heat recovery train 50 is passed to water-gas shift reactor 60 to shift the reformate and form additional $H_2$. Additional hydrogen gas may be obtained by the catalytic reaction of carbon monoxide and steam. This reaction is exothermic and is commonly referred to as the water-gas shift reaction or shift reaction: $CO + H_2O \rightarrow CO_2 + H_2$. The reaction is affected by passing carbon monoxide and water through a bed of a suitable catalyst.

Any suitable shift catalyst may be used. The shift reactor may be a so-called high temperature shift (HTS), low temperature shift (LTS), medium temperature shift (MTS), or combination. Since the article "a" means "one or more," one or more shift reactors may be used in the process.

For high temperature shift, an inlet temperature in the range 330° C. to 400° C., and an outlet temperature in the range 400° C. to 500° C. is typical. Usually an iron oxide/chromia catalyst is used for high temperature shift.

For low temperature shift, an inlet temperature in the range 190° C. to 230° C., and an outlet temperature in the range 220° to 250° C. is typical. Usually a catalyst comprising metallic copper, zinc oxide, and one or more other difficulty reducible oxides such as alumina or chromia is used for low temperature shift For medium temperature shift, an inlet temperature in the range 190° C. to 230° C. and an outlet temperature of up to 350° C. is typical. A suitably formulated supported copper catalyst can be used for medium temperature shift.

A combination may include a sequence of high temperature shift, cooling by indirect heat exchange, and low temperature shift. If desired, either shift stage can be subdivided with interbed cooling.

The process further comprises recovering heat from the shifted reformate thereby cooling the shifted reformate. In the step of recovering heat from the shifted reformate, feed water may be heated by indirect heat exchange between the feed water and the shifted reformate.

As shown in FIGS. 1 and 2, feed water 86 is passed to heat recovery train 70 to be heated by the shifted reformate by indirect heat transfer. The heated feed water may be passed to steam drum 40 as shown in FIG. 1 or to saturator 35 as shown in FIG. 2.

Heat may be provided for $CO_2$ stripping in an acid gas removal system in the step of recovering heat from the shifted reformate. Heat may be provided for reboil in a column for $CO_2$ stripping.

The process further comprises removing $H_2O$ from the shifted reformate to form a water-depleted reformate. The term "depleted" means having a lesser mole % concentration of the indicated gas than the original stream from which it was formed. "Depleted" does not mean that the stream is completely lacking the indicated gas.

$H_2O$ may be removed from the shifted reformate by any known means. As shown in FIGS. 1 and 2, $H_2O$, as condensate, may be conveniently removed from the shifted reformate in a vapor-liquid separator 80. A vapor-liquid separator may also be referred to as a flash drum, knock-out drum, or knock-out pot. $H_2O$ removed from the shifted reformate may be used to form boiler feed water with makeup water 84 added.

The process further comprises separating the water-depleted reformate into a $CO_2$ product stream and a pressure swing adsorber feed stream. The pressure swing adsorber feed stream comprises $H_2$ and secondary gas components. The secondary gas components comprise CO, $N_2$, Ar, and $CH_4$.

The $CO_2$ may be separated from the water-depleted reformate by any known means. As shown in FIGS. 1 and 2, the water-depleted reformate is passed from vapor-liquid separator 80 to $CO_2$ removal system 90 where a $CO_2$ product stream 92 is removed and a pressure swing adsorber feed stream is passed to pressure swing adsorption beds 100.

The water-depleted reformate may be separated by liquid absorption. The water-depleted reformate may be separated by any known acid gas removal system, such as amine-based systems, for example aMDEA, MEA, or potassium-based systems, for example, the Benfield™ process.

The water-depleted reformate may be separated by pressure swing adsorption. The water-depleted reformate may be separated in any known vacuum pressure swing adsorption system for separating $CO_2$ from a $CO_2$-containing mixture.

The process further comprises separating the pressure swing adsorber feed stream in a plurality of at least 4 pressure swing adsorption beds, each adsorption bed containing an adsorbent selective for the secondary gas components thereby forming a $H_2$ product stream and a pressure swing adsorption tail gas stream. An adsorbent "selective for the secondary components" means that the secondary components are more strongly adsorbed on the adsorbent than the primary component. For the case where the primary gas component is $H_2$, and the secondary gas components comprise CO, $CO_2$, and $CH_4$, the adsorbent is selective for CO, $CO_2$, and $CH_4$. Suitable adsorbents for CO, $CO_2$, and $CH_4$ are known in the art, for example, activated carbon, alumina, silica gel, and zeolites such as NaX, LiX, CaX, and CaA, and mixtures thereof.

The step of separating the pressure swing adsorber feed stream may be performed in at least 5 adsorption beds, or at least 6 adsorption beds, or at least 8 adsorption beds, or at least 10 adsorption beds, or at least 12 adsorption beds, each adsorption bed containing an adsorbent selective for the secondary components.

As pressure swing adsorption (PSA) processes are well-known, one of ordinary skill in the art can construct an adsorption system suitable for carrying out the process described herein. Suitable equipment for carrying out the process is well-known in the art. Operating conditions not specifically disclosed herein that are suitable for use in the process described herein may be determined by one skilled in the art without undue experimentation.

The process may be carried out in axial adsorbent beds or radial adsorbent beds.

As shown in FIGS. 1 and 2, the pressure swing adsorber feed stream is passed to pressure swing adsorption beds 100 where the stream is separated into $H_2$ product stream 102 and pressure swing adsorption tail gas stream 104. The tail gas stream 104 comprises all streams other than the hydrogen product stream 102. The hydrogen product stream may have a hydrogen concentration greater than 98.5 vol. %. The tail gas stream may comprise $H_2$, $CH_4$, CO, $N_2$, and small amounts of $CO_2$, Ar, and $H_2O$.

The process further comprises introducing a first portion 114 of the tail gas stream into at least one of reactor 10, and reactor 20. If the first portion is introduced into reactor 10, the first portion 114 of the tail gas stream may be mixed and introduced together with the steam and hydrocarbon feed into reactor 10 or introduced separately from the steam and hydrocarbon feed. If the first portion is introduced into reactor 20, the first portion 114 of the tail gas stream may be mixed and introduced together with the reformate and/or oxygen 22 or introduced separately from the other streams. The molar flow rate of the first portion 114 of the tail gas stream may be 15% to 80% or 30% to 40% of the molar flow rate of the tail gas stream 104.

The process further comprises introducing (i.e. recycling) a second portion 112 of the tail gas stream into at least one of the plurality of pressure swing adsorption beds 100. The molar flow rate of the second portion 112 of the tail gas stream may be 1% to 65% or 5% to 80% of the molar flow rate of the tail gas stream 104.

The process may further comprise combusting a third portion 106 of the tail gas stream in a boiler to generate a portion of the steam introduced into reactor 10. As depicted in FIGS. 1 and 2, a third portion 106 of the tail gas and an oxygen-containing stream 124 are introduced into boiler 120 where combustible gases in the third portion of the tail gas are combusted to form combustion products 122, which are withdrawn from the boiler 120. Steam is formed by indirect heat exchange between heated feed water 86 and the combustion products 122. Steam may then be added to the hydrocarbon mixture from desulfurizer 30, as shown in FIG. 1, or added to the mixed feed from saturator 35, as shown in FIG. 2. The resultant mixture may then be introduced into reactor 10. The molar flow rate of the third portion 106 of the tail gas stream may be 1% to 25% of the molar flow rate of the tail gas stream 104.

Alternatively to generating steam in boiler 120, steam may be imported into the process.

The step of separating the pressure swing adsorber feed stream will be described with reference to FIGS. 3-20.

Figure 3:
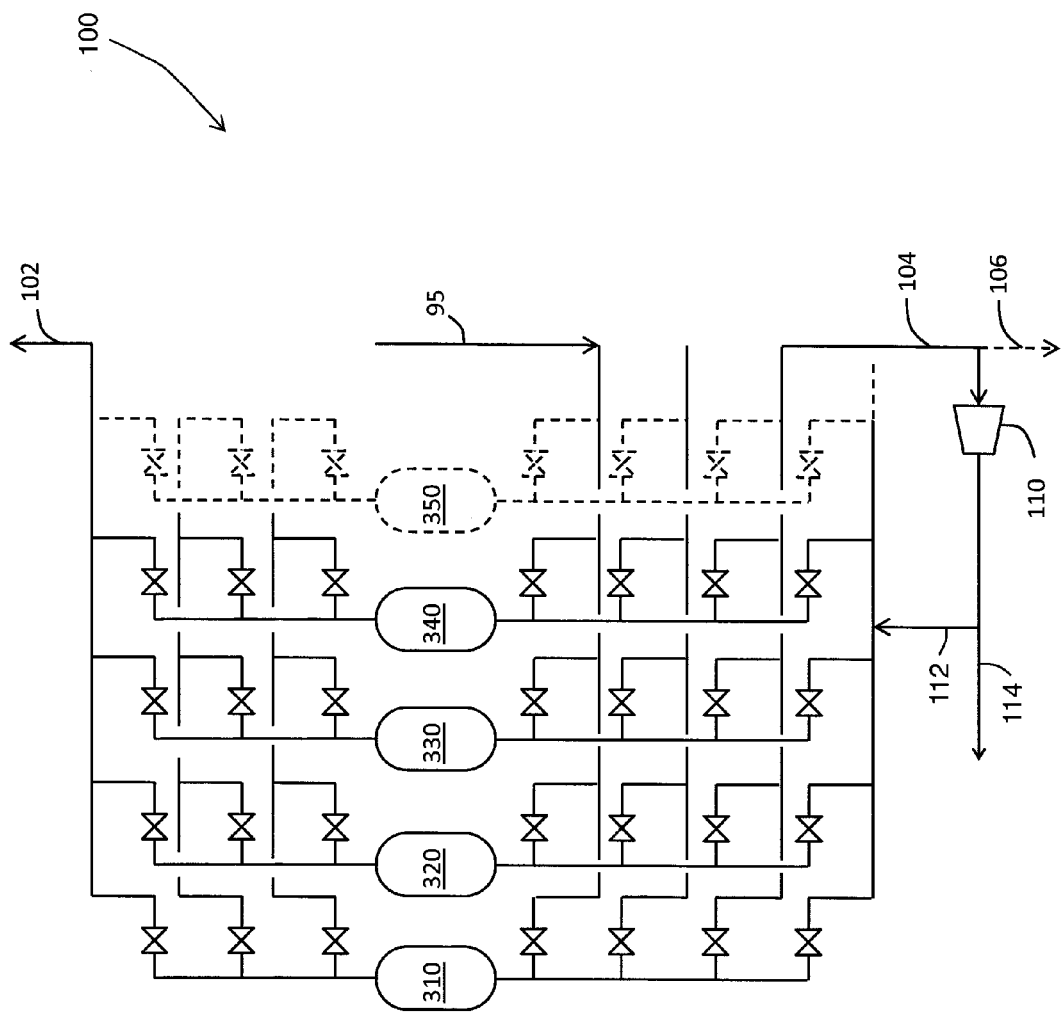
FIG. 3 is a schematic of an adsorption system having at least 4 adsorption beds.

FIG. 3 shows a schematic of an example adsorption system with adsorption beds 310, 320, 330, 340, and 350 suitable for the step of separating the pressure swing adsorber feed stream.

An adsorption bed is a grouping of adsorption material which undergoes each of the cycle steps contemporaneously. An adsorption bed may be contained in a single containment vessel or contained within multiple containment vessels. For example, with reference to the 4 bed cycle in FIG. 4a and the adsorption system schematic in FIG. 3, all of the adsorption material in adsorption bed 310 undergoes the feed step contemporaneously, then all of the adsorption material in adsorption bed 310 undergoes the first pressure decreasing equalization (eq1d) step contemporaneously, then all of the adsorption material in adsorption bed 310 undergoes the provide purge (pp) step contemporaneously, then all of the adsorption material in adsorption bed 310 undergoes the blowdown (bd) step contemporaneously, then all of the adsorption material in adsorption bed 310 undergoes the purge step contemporaneously, then all of the adsorption material in adsorption bed 310 undergoes the first pressure increasing equalization step (eq1r) step contemporaneously, then all of the adsorption material in adsorption bed 310 undergoes the repressurization (repr) step contemporaneously.

Each of the adsorption beds has an "inlet end" and a "discharge end," so termed because of their function during the feed step (also called the adsorption step) of the adsorption cycle. A feed gas mixture is introduced into the "inlet end" of the adsorption bed and an effluent gas is withdrawn from the "discharge end" during the feed step of the cycle. During other steps of the adsorption cycle, gas may be introduced or withdrawn from "inlet end." Likewise, during other steps of the adsorption cycle, gas may be introduced or withdrawn from the "discharge end."

The step of separating the pressure swing adsorber feed stream comprises subjecting each of the plurality of adsorption beds to a repetitive cycle. The repetitive cycle comprising, in sequence, a feed step, a first pressure decreasing equalization step, a provide purge step, a blowdown step, a purge step, a first pressure increasing equalization step, and a repressurization step.

The feed step, designated "feed" in the figures, comprises introducing the pressure swing adsorber feed stream at a feed gas pressure ranging from 1.0 MPa to 7.0 MPa or from 1.0 MPa to 3.6 MPa into an adsorption bed undergoing the feed step and adsorbing the secondary gas components (e.g. CO, $CO_2$, and/or $CH_4$) on the adsorbent in the adsorption bed undergoing the feed step while simultaneously withdrawing the hydrogen product stream 102 from the adsorption bed undergoing the feed step. The product gas contains a higher concentration of $H_2$ than the pressure swing adsorber feed stream and is depleted of the secondary gas components. The duration of the feed step may be 30 seconds to 300 seconds.

The process may be carried out at a temperature ranging from 4° C. to 60° C.

The step of introducing the second portion of the tail gas stream may comprise co-currently introducing the second portion 112 of the tail gas stream into a pressure swing adsorption bed undergoing the feed step along with the pressure swing adsorber feed stream.

The term "depleted" means having a lesser mole % concentration of the indicated gas than the original stream from which it was formed. "Depleted" does not mean that the stream is completely lacking the indicated gas. The product gas withdrawn during the feed step therefore has a higher mole % concentration of the primary gas component than the feed gas mixture due to adsorption of the secondary gas components on the adsorbent.

At the end of the feed step, the adsorption bed contains what is called a void space gas which is a combination of both gas phase and adsorbed phase molecules. The void space gas has a higher average concentration of the more strongly adsorbable components than the feed gas mixture since the less adsorbable components were withdrawn as the product stream. The concentration of the various components of the void space gas mixture will generally vary as a function of distance from the inlet end to the discharge end of the adsorption bed. The void space gas near the discharge end will generally have a higher concentration of weakly adsorbable components and non-adsorbable components. The void space gas near the inlet end will generally have a higher concentration of the more strongly adsorbable components.

The direction of flow during other steps is typically described with reference to the direction of flow during the feed step. Thus gas flow in the same direction as the gas flow during the feed step is "co-current" and gas flow that is in the opposite direction to the gas flow during the feed step is "counter-current." Co-currently introducing a gas into an adsorption bed means to introduce the gas in the same direction as the gas flow during the feed step. Counter-currently introducing a gas into an adsorption bed means to introduce the gas in a direction opposite to the direction of the gas flow during the feed step. Co-currently withdrawing a gas from an adsorption bed means to withdraw the gas in the same direction as the gas flow during the feed step. Counter-currently withdrawing a gas from an adsorption bed means to withdraw the gas in a direction opposite to the direction of the gas flow during the feed step.

Gas may be simultaneously co-currently introduced to the inlet end and counter-currently introduced to the discharge end. Gas may be simultaneously co-currently withdrawn from discharge end and counter-currently withdrawn from the inlet end.

When gas is withdrawn from an intermediate position to the inlet end and the discharge end, a portion of the gas is co-currently withdrawn and a portion is counter-currently withdrawn. When gas is introduced to an intermediate position to the inlet end and the discharge end, a portion of the gas is co-currently introduced and a portion is counter-currently introduced.

The first pressure decreasing equalization step, designated by "eq1d," in the figures, comprises co-currently withdrawing a pressure equalization gas from an adsorption bed undergoing the first pressure decreasing equalization step, and passing the pressure equalization gas to an adsorption bed undergoing the first pressure increasing equalization step thereby equalizing the pressure between the adsorption bed undergoing the first pressure decreasing equalization step and the adsorption bed undergoing the first pressure increasing equalization step. The first pressure increasing equalization step is designated by "eq1r".

As defined herein, "equalizing the pressure" means that the pressure difference between the adsorption beds at the end of the pressure equalization step is less than 250 kPa (36 psi). Then, at the end of the first pressure decreasing equalization step and the pressure increasing equalization step, the pressure in the adsorption bed at the end of the first pressure decreasing equalization step is no greater than 250 KPa more than the pressure in the adsorption bed at the end of the first pressure increasing equalization step.

The step of introducing the second portion of the tail gas stream may comprise co-currently introducing the second portion of the tail gas stream into a pressure swing adsorption bed undergoing the first pressure decreasing equalization step as a rinse gas simultaneously with the withdrawing of the pressure equalization gas.

The duration of the first pressure decreasing equalization step may be 15 seconds to 150 seconds.

The provide purge step, designated "pp" in the figures, comprises co-currently withdrawing a purge gas from an adsorption bed undergoing the provide purge step, and passing the purge gas from the adsorption bed undergoing the provide purge step to an adsorption bed undergoing the purge step.

The blowdown step, designated "bd" in the figures, comprises counter-currently withdrawing a blowdown gas from an adsorption bed undergoing the blowdown step. The blowdown gas has a concentration of the secondary gas components that is higher than the concentration of the secondary gas components in the feed gas mixture. The blowdown gas may be withdrawn from the adsorption bed undergoing the blowdown step until the pressure in the adsorption bed undergoing the blowdown step reaches a blowdown pressure ranging from 100 kPa to 500 kPa. The blowdown pressure is the pressure in the adsorption bed at the end of the blowdown step.

The purge step, designated "purge" in the figures, comprises counter-currently introducing the purge gas from the adsorption bed undergoing the provide purge step, into an adsorption bed undergoing the purge step and counter-currently withdrawing a purge gas effluent from the adsorption bed undergoing the purge step. The purge gas effluent has a concentration of the secondary gas components that is higher than the concentration of the secondary gas components in the feed gas mixture.

The first pressure increasing equalization step comprises counter-currently introducing the pressure equalization gas from the adsorption bed undergoing the first pressure decreasing equalization step into the adsorption bed undergoing the first pressure increasing equalization step.

As used herein, the terms "first," "second," "third," "fourth," etc. are used to distinguish from among a plurality of pressure increasing/decreasing equalization steps and does not indicate its relative position in time.

The first pressure increasing equalization step may further comprise co-currently introducing the feed gas mixture and/or counter-currently introducing product gas into the adsorption bed undergoing the first pressure increasing equalization step simultaneous with the counter-current introduction of the pressure equalization gas from the adsorption bed undergoing the first pressure decreasing equalization step.

The repressurization step, designated "repr" in the figures, comprises increasing the pressure in an adsorption bed undergoing the repressurization step until the adsorption bed undergoing the repressurization step is substantially at the feed gas pressure. The pressure in the adsorption bed undergoing the repressurization step may be increased by at least one of (1) co-currently introducing the feed gas mixture into the adsorption bed undergoing the repressurization step, and (2) counter-currently introducing a portion of the product gas from the adsorption bed undergoing the feed step into the adsorption bed undergoing the repressurization step.

"Substantially at the feed gas pressure" means within 10% of the feed gas pressure.

The repetitive cycle in the process may further comprise a rinse step. The rinse step, designated "rinse" in the figures, if present, is after the feed step and before the first pressure decreasing equalization step in the repetitive cycle. When the repetitive cycle includes a rinse step, the step of introducing the second portion of the tail gas stream may comprise co-currently introducing the second portion of the tail gas stream into an adsorption bed undergoing the rinse step while simultaneously co-currently withdrawing a rinse gas effluent from the adsorption bed undergoing the rinse step. The rinse gas effluent may be combined with the product gas.

When the repetitive cycle includes a rinse step, the repressurization step may further comprise counter-currently introducing at least a portion of the rinse gas effluent from the adsorption bed undergoing the rinse step into the adsorption bed undergoing the repressurization step.

The second portion 112 of the tail gas stream is formed by compressing at least a portion of the tail gas stream 104. Compressor 110 compresses at least a portion of the tail gas stream 104. The second portion 112 of the tail gas stream may be passed directly to the adsorption bed undergoing one or more of the feed step, the first pressure decreasing equalization step, the provide purge step, and the rinse step or stored temporarily in a buffer tank (115 in FIG. 10b) before being passed to an adsorption bed.

An amount of gas is withdrawn during the blowdown step and an amount of gas is withdrawn during the purge step. The rinse gas may comprise 5 to 80 weight % of the combined amount of gas withdrawn during the blowdown step and during the purge step.

The repetitive cycle in the process may further comprise additional pressure decreasing equalization steps and complementary additional pressure increasing equalization steps. Any suitable number of additional pressure decreasing/increasing equalization steps may be used. The one or more additional pressure decreasing equalization steps are designated by at least one of "eq1d," "eq2d," "eq3d," or "eq4d," in the figures, excluding the one designating the first pressure decreasing equalization step. The one or more additional pressure increasing equalization steps are designated by at least one of "eq1r," "eq2r," "eq3r," or "eq4r," in the figures, excluding the one designating the first pressure increasing equalization step.

The one or more additional pressure decreasing equalization steps comprise co-currently withdrawing pressure equalization gas from an adsorption bed undergoing the additional pressure decreasing equalization step, and passing the pressure equalization gas to an adsorption bed undergoing the additional pressure increasing equalization step thereby equalizing the pressure between the adsorption bed undergoing the additional pressure decreasing equalization step and the adsorption bed undergoing the additional pressure increasing equalization step.

The step of introducing the second portion of the tail gas stream may further comprise co-currently introducing the second portion of the tail gas stream into a pressure swing adsorption bed undergoing any of the additional pressure decreasing equalization step simultaneously with the withdrawing of the pressure equalization gas and/or may further comprise co-currently introducing the second portion of the tail gas stream into a pressure swing adsorption bed undergoing the provide purge step simultaneously with the withdrawing of the purge gas.

FIGS. 4-20 illustrate a number of pressure swing adsorption cycles suitable for the process.

FIG. 4a is a cycle chart for a 4 adsorption bed cycle having a single pressure equalization step. FIG. 4b is a schematic illustrating the direction of gas flows for the cycle chart of FIG. 4a.

Figures 5A, 5B:
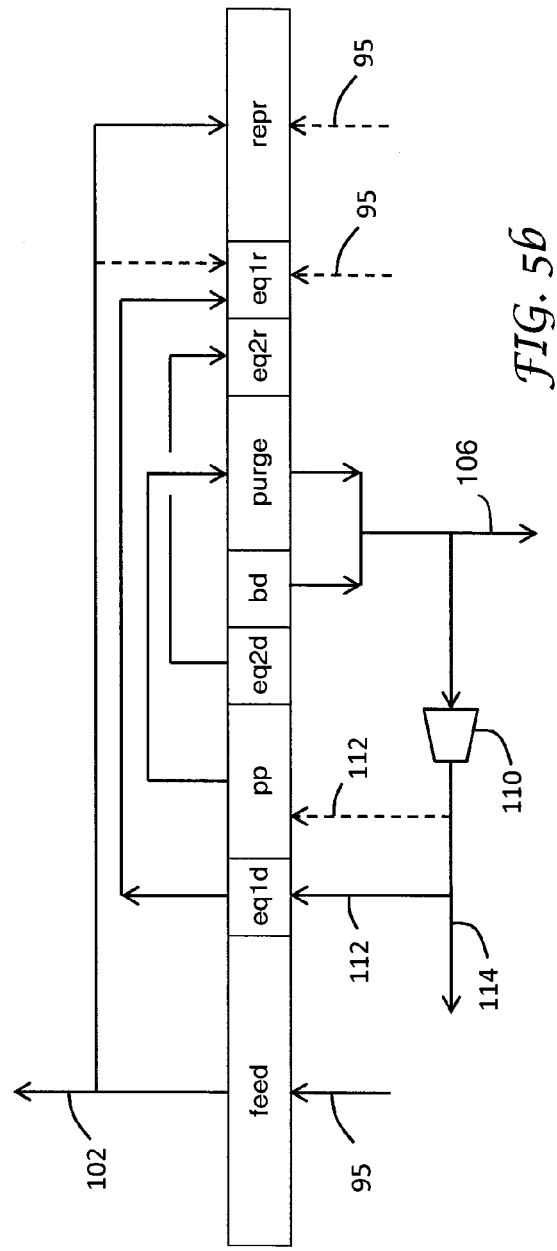

FIG. 5a is a cycle chart for a 4 adsorption bed cycle having two pressure equalization steps. FIG. 5b is a schematic illustrating the direction of gas flows for the cycle chart of FIG. 5a.

FIG. 6a is a cycle chart for a 4 adsorption bed cycle having a rinse step and one pressure equalization step. FIG. 6b is a schematic illustrating the direction of gas flows for the cycle chart of FIG. 6a.

FIG. 7a is a cycle chart for a 5 adsorption bed cycle having two pressure equalization steps. FIG. 7b is a schematic illustrating the direction of gas flows for the cycle chart of FIG. 7a.

FIG. 8a is a cycle chart for a 5 adsorption bed cycle having three pressure equalization steps. FIG. 8b is a schematic illustrating the direction of gas flows for the cycle chart of FIG. 8a.

Figures 9A, 9B:
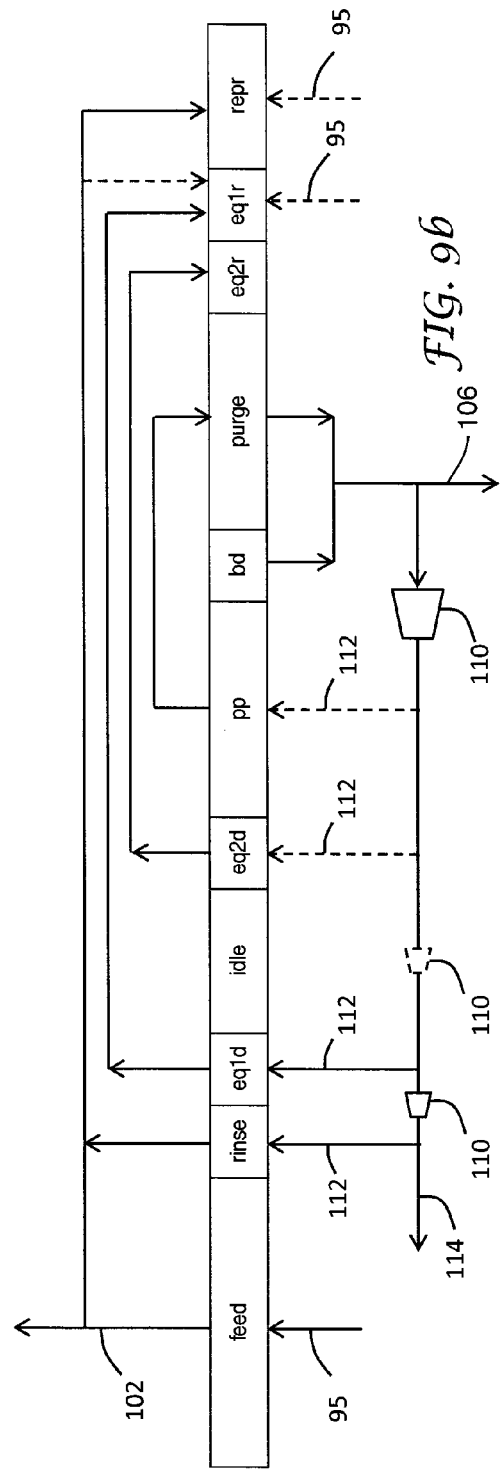

FIG. 9a is a cycle chart for a 5 adsorption bed cycle having two pressure equalization steps and a rinse step. FIG. 9b is a schematic illustrating the direction of gas flows for the cycle chart of FIG. 9a.

Figures 10A, 10B:
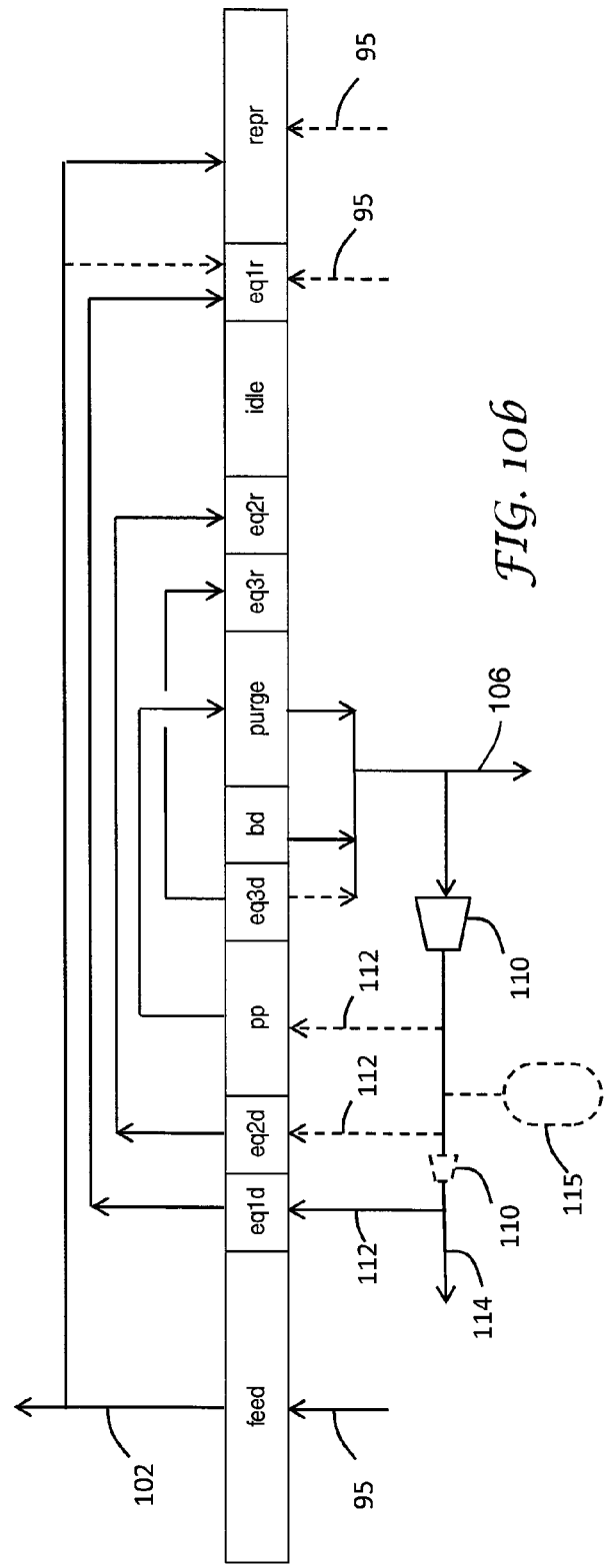

FIG. 10a is a cycle chart for a 5 adsorption bed cycle having three pressure equalization steps. FIG. 10b is a schematic illustrating the direction of gas flows for the cycle chart of FIG. 10a.

Figures 11A, 11B:
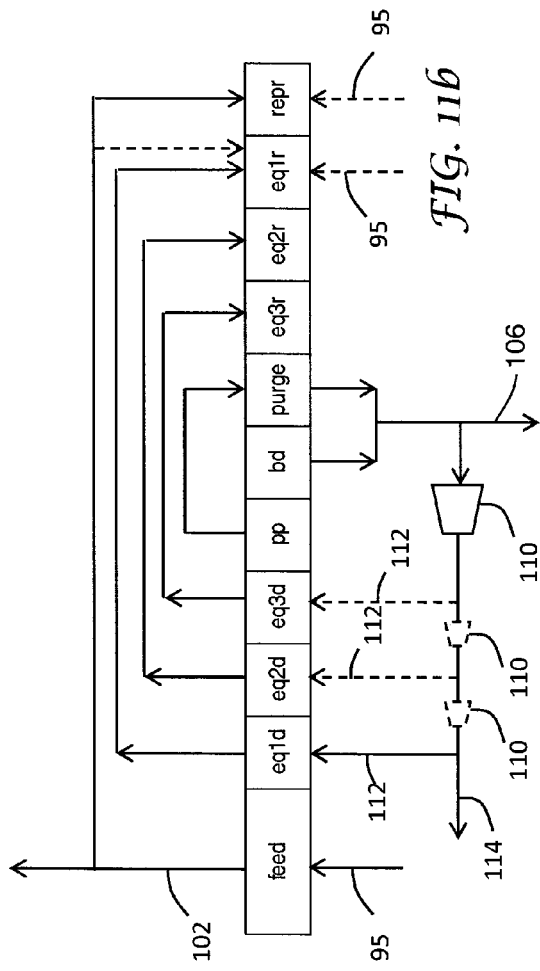

FIG. 11a is a cycle chart for a 6 adsorption bed cycle having three pressure equalization steps. FIG. 11b is a schematic illustrating the direction of gas flows for the cycle chart of FIG. 11a.

Figures 12A, 12B:
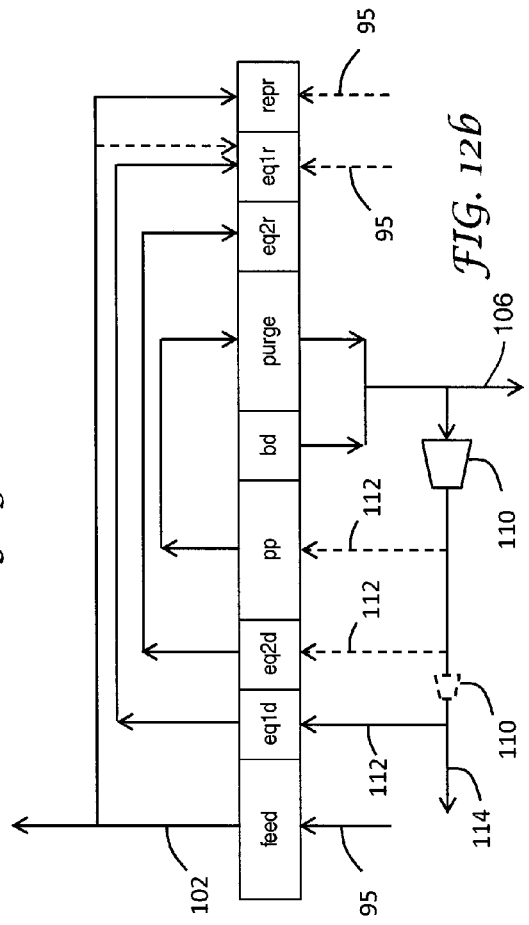

FIG. 12a is a cycle chart for a 6 adsorption bed cycle having two pressure equalization steps. FIG. 12b is a schematic illustrating the direction of gas flows for the cycle chart of FIG. 12a.

Figures 13A, 13B:
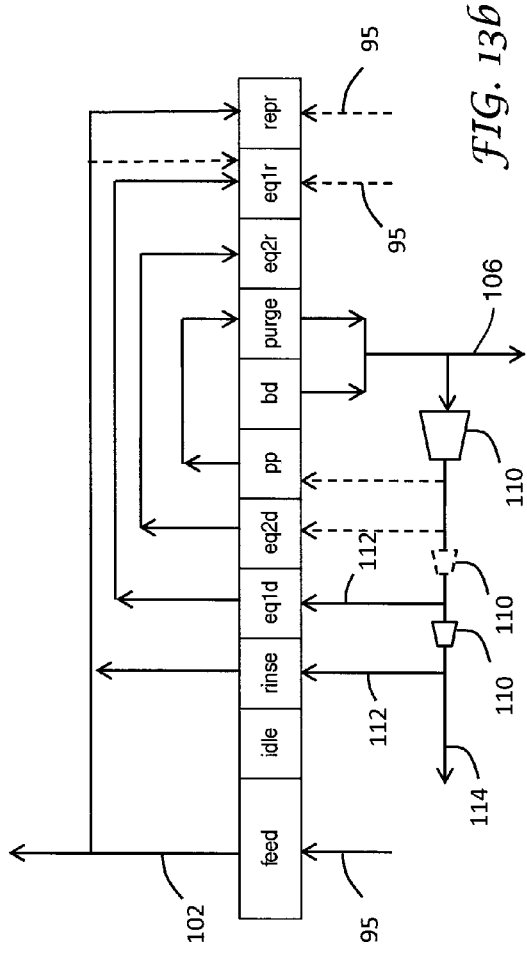

FIG. 13a is a cycle chart for a 6 adsorption bed cycle having two pressure equalization steps and a rinse step. FIG. 13b is a schematic illustrating the direction of gas flows for the cycle chart of FIG. 13a.

Figures 14A, 14B:
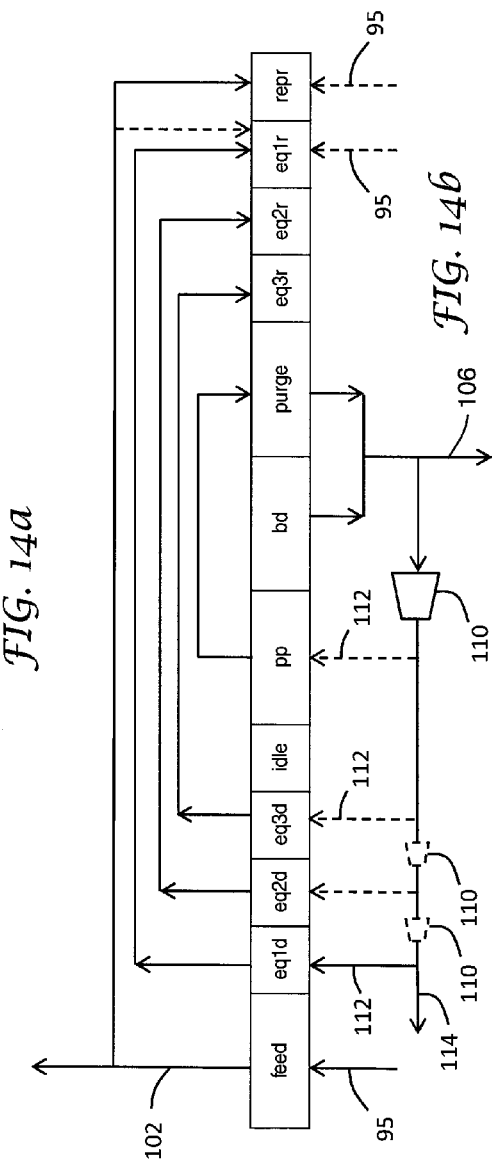

FIG. 14a is a cycle chart for an 8 adsorption bed cycle having three pressure equalization steps. FIG. 14b is a schematic illustrating the direction of gas flows for the cycle chart of FIG. 14a.

Figures 15A, 15B:
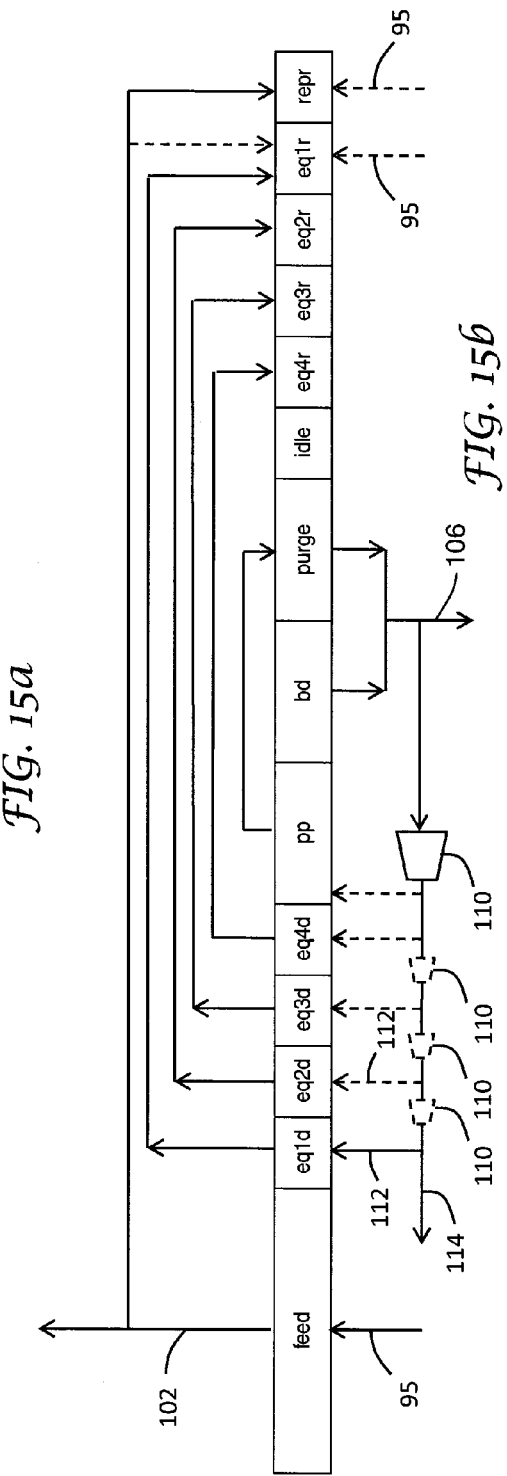

FIG. 15a is a cycle chart for a 10 adsorption bed cycle having four pressure equalization steps. FIG. 15b is a schematic illustrating the direction of gas flows for the cycle chart of FIG. 15a.

Figures 16A, 16B:
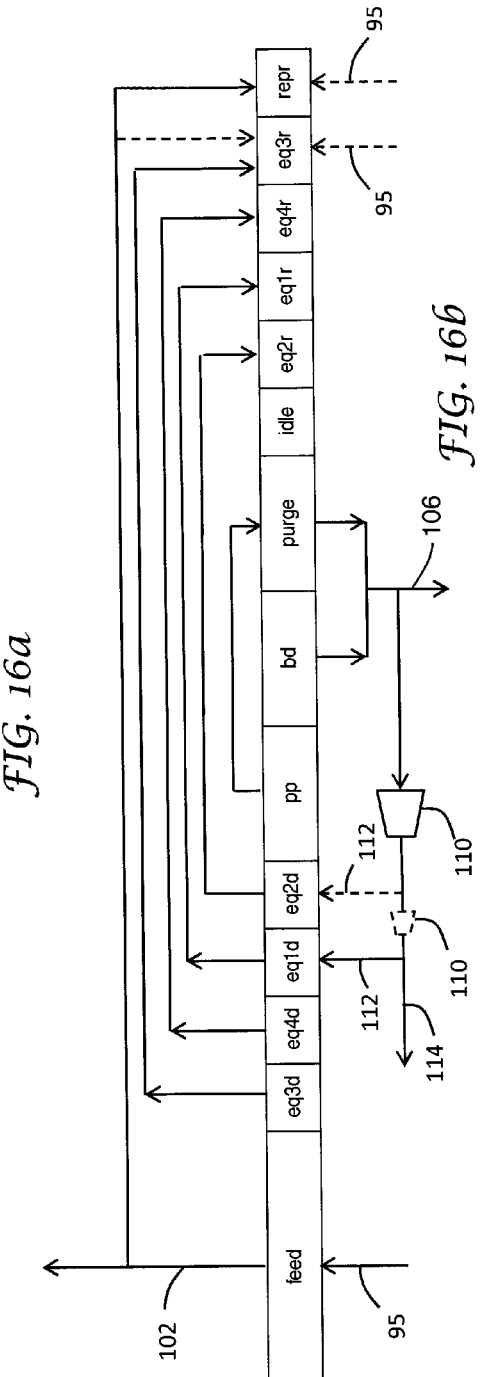

FIG. 16a is a cycle chart for a 10 adsorption bed cycle having four pressure equalization steps. FIG. 16b is a schematic illustrating the direction of gas flows for the cycle chart of FIG. 16a.

Figures 17A, 17B:
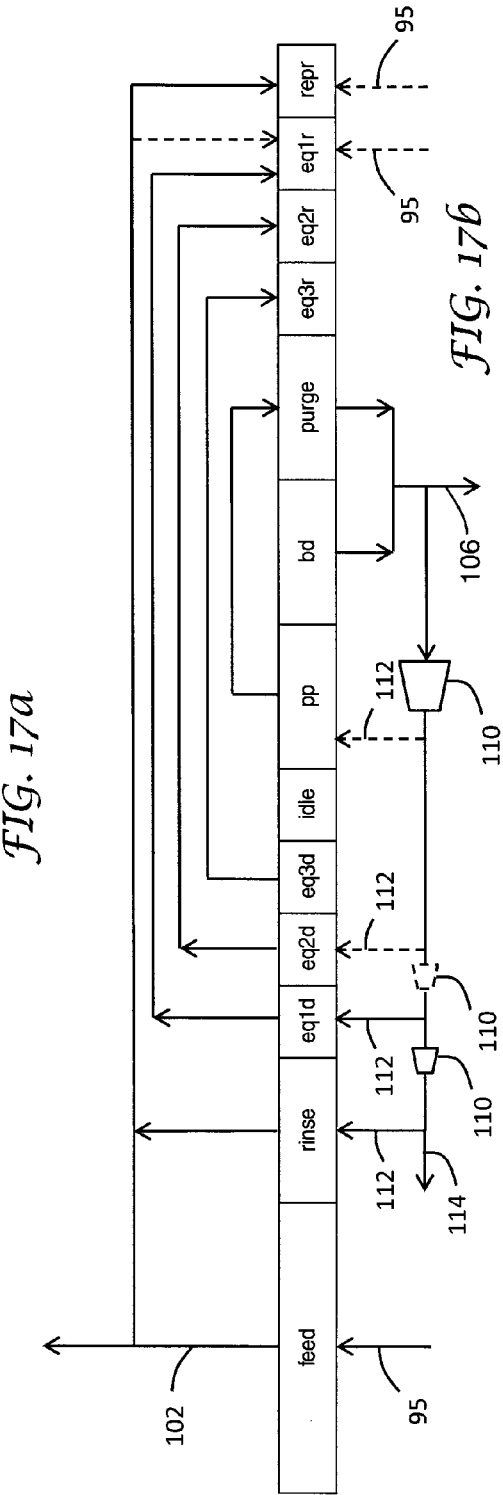

FIG. 17a is a cycle chart for a 10 adsorption bed cycle having three pressure equalization steps and a rinse step. FIG. 17b is a schematic illustrating the direction of gas flows for the cycle chart of FIG. 17a.

Figures 18A, 18B:
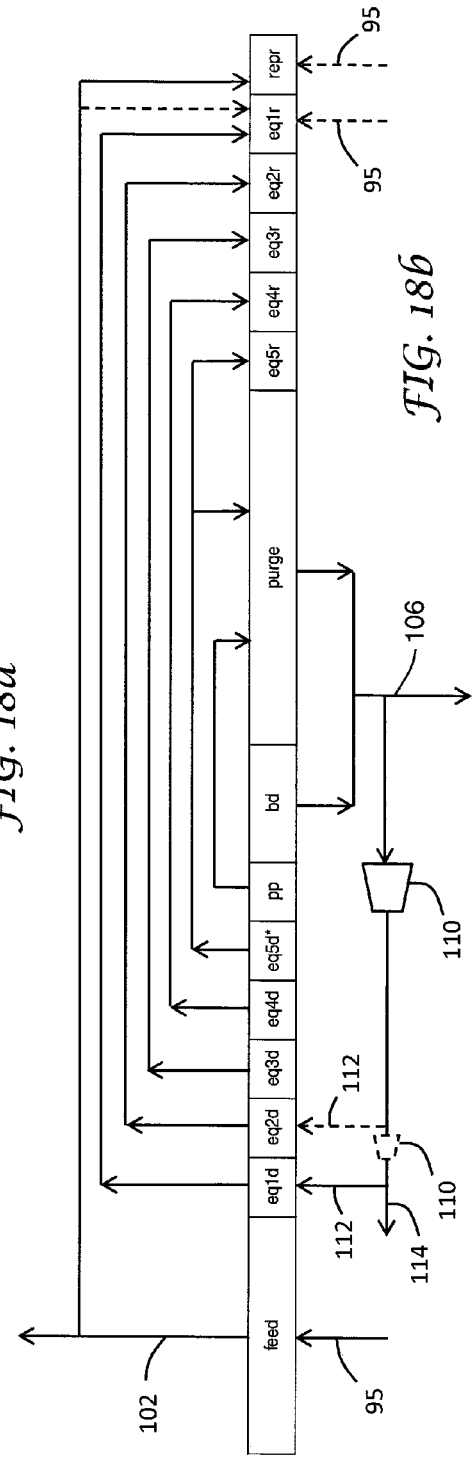

FIG. 18a is a cycle chart for a 12 adsorption bed cycle having five pressure equalization steps. FIG. 18b is a schematic illustrating the direction of gas flows for the cycle chart of FIG. 18a.

Figures 19A, 19B:
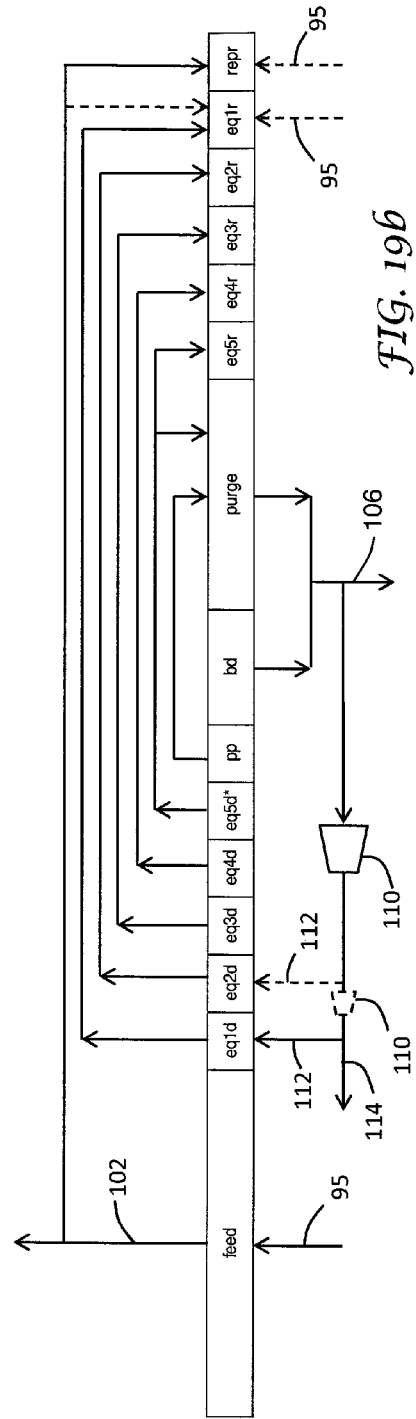

FIG. 19a is a cycle chart for a 12 adsorption bed cycle having five pressure equalization steps. FIG. 19b is a schematic illustrating the direction of gas flows for the cycle chart of FIG. 19a.

Figures 20A, 20B:
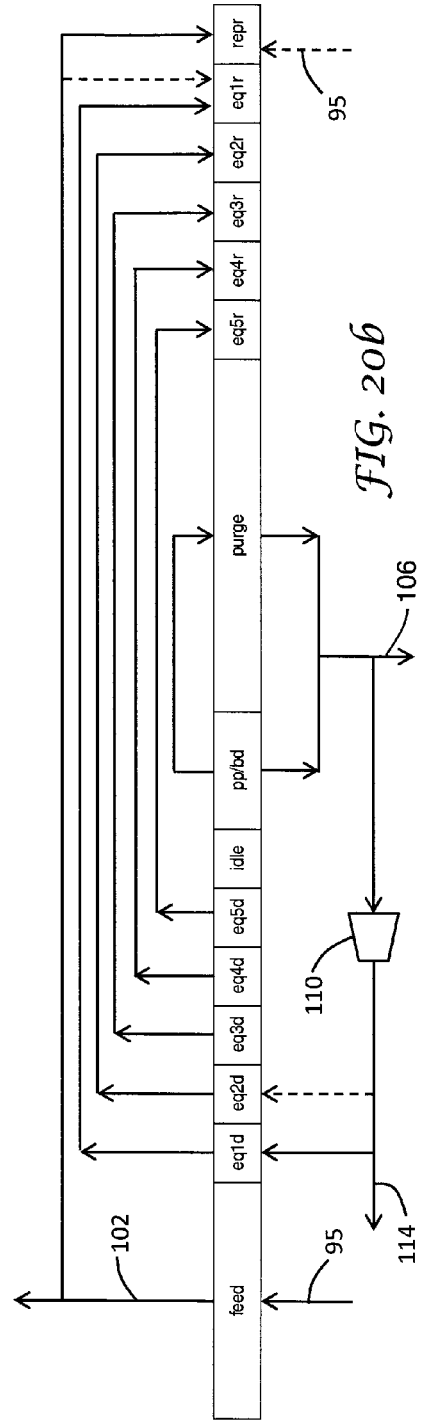

FIG. 20a is a cycle chart for a 12 adsorption bed cycle having five pressure equalization steps. FIG. 20b is a schematic illustrating the direction of gas flows for the cycle chart of FIG. 20a.

EXAMPLES

An process simulator was used to calculate the performance of hydrogen generation processes where hydrocarbons are reformed in an autothermal reformer and the effluent from the autothermal reformer is separated in a pressure swing adsorption system. For each of the cases, the simulated pressure swing adsorption system has 10 adsorption beds.

For each of the examples, a portion of the PSA tail gas is used as fuel in an amount to provide 17.6 MW energy. PSA tail gas in excess of the amount required to provide 17.6 MW energy is recycled in each of the examples.

Example 1

Comparative Example

Figure 21:
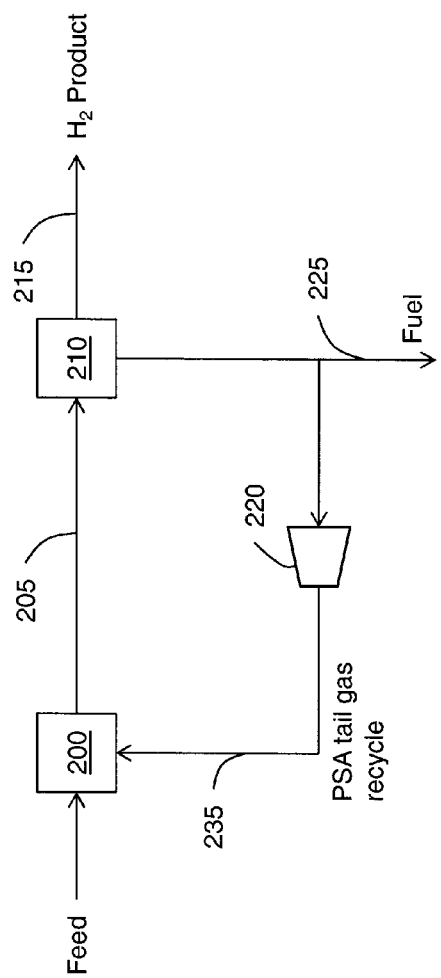
FIG. 21 is a process flow diagram for comparative example 1.

The PSA cycle for example 1 is represented by FIG. 15a, but is not represented by FIG. 15b. For example 1, a portion of the PSA tail gas from PSA 210 is used as fuel 225, and a second portion 235 is compressed in compressor 220 and recycled to the hydrogen generator 200 as shown in FIG. 21. None of the PSA tail gas is recycled to the PSA adsorption system.

Stream compositions and flow rates for PSA feed stream 205 are summarized in Table 1. Stream compositions and flow rates for hydrogen product stream 215 are summarized in Table 2. Stream compositions and flow rates for fuel stream 225 are summarized in Table 3. Stream compositions and flow rates for PSA tail gas stream 235 recycled to hydrogen generator 200 are summarized in Table 4.

TABLE 1

| Component | Mole Fraction | Flow Rate (kmoles/h) |
| --- | --- | --- |
| $N_2$ | 0.0263 | 154.7 |
| Ar | 0.0014 | 8.2 |
| $CO_2$ | 0.0030 | 17.6 |
| $CH_4$ | 0.0070 | 41.2 |
| CO | 0.0300 | 176.4 |
| $H_2$ | 0.9323 | 5482.3 |

TABLE 2

| Component | Mole Fraction | Flow Rate (kmoles/h) |
| --- | --- | --- |
| $N_2$ | 25 ppm | 0.1 |
| Ar | 677 ppm | 3.2 |
| $CO_2$ | 0 | 0 |
| $CH_4$ | 0 | 0 |
| CO | 0 | 0 |
| $H_2$ | 0.9993 | 4778.4 |

TABLE 3

| Component | Mole Fraction | Flow Rate (kmoles/h) |
| --- | --- | --- |
| $N_2$ | 0.1407 | 34.2 |
| Ar | 0.0045 | 1.1 |
| $CO_2$ | 0.0160 | 3.9 |
| $CH_4$ | 0.0375 | 9.1 |
| CO | 0.1606 | 39.1 |
| $H_2$ | 0.6407 | 155.8 |

TABLE 4

| Component | Mole Fraction | Flow Rate (kmoles/h) |
| --- | --- | --- |
| $N_2$ | 0.1407 | 120.4 |
| Ar | 0.0045 | 3.9 |
| $CO_2$ | 0.0160 | 13.7 |
| $CH_4$ | 0.0375 | 32.1 |
| CO | 0.1606 | 137.4 |
| $H_2$ | 0.6407 | 548.2 |

The calculated hydrogen recovery for example 1 is 87%.

Example 2

Figure 22:
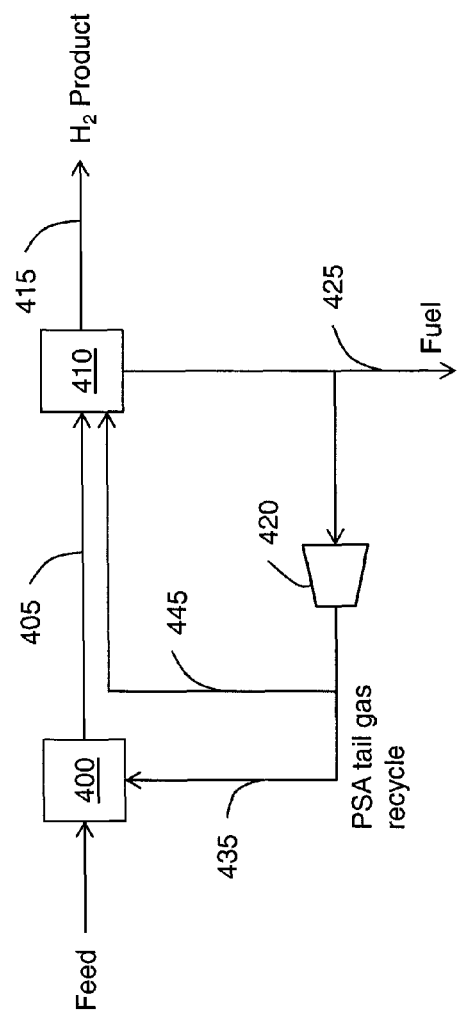
FIG. 22 is a process flow diagram for examples 2 and 3.

The PSA cycle for example 2 is represented by FIGS. 15a and 15b, where PSA tail gas is recycled to adsorption beds undergoing eq1d and eq2d, but not eq3d or eq4d. For example 2, a portion of the PSA tail gas from PSA 410 is used as fuel 425, a portion 435 is compressed in compressor 420 and recycled to the hydrogen generator 400 and another portion 445 is compressed and recycled to the PSA as shown in FIG. 22.

Stream compositions and flow rates for PSA feed stream 405 are summarized in Table 5. Stream compositions and flow rates for hydrogen product stream 415 are summarized in Table 6. Stream compositions and flow rates for fuel stream 425 are summarized in Table 7. Stream compositions and flow rates for PSA tail gas stream 435 recycled to hydrogen generator 400 are summarized in Table 8. Stream compositions and flow rates for PSA tail gas stream 445 recycled to the PSA system in beds undergoing eq1d and eq2d are summarized in Table 9.

TABLE 5

| Component | Mole Fraction | Flow Rate (kmoles/h) |
| --- | --- | --- |
| $N_2$ | 0.0168 | 90.9 |
| Ar | 0.0011 | 6.4 |
| $CO_2$ | 0.0030 | 16.4 |
| $CH_4$ | 0.0071 | 38.2 |
| CO | 0.0303 | 163.8 |
| $H_2$ | 0.9416 | 5089.9 |

TABLE 6

| Component | Mole Fraction | Flow Rate (kmoles/h) |
| --- | --- | --- |
| $N_2$ | 61 ppm | 0.3 |
| Ar | 641 ppm | 3.1 |
| $CO_2$ | 0 | 0 |
| $CH_4$ | 0 | 0 |
| CO | 0 | 0 |
| $H_2$ | 0.9992 | 4778.4 |

TABLE 7

| Component | Mole Fraction | Flow Rate (kmoles/h) |
| --- | --- | --- |
| $N_2$ | 0.1454 | 34.1 |
| Ar | 0.0054 | 1.3 |
| $CO_2$ | 0.0263 | 6.2 |
| $CH_4$ | 0.0612 | 14.3 |
| CO | 0.2625 | 61.5 |
| $H_2$ | 0.4992 | 117.0 |

TABLE 8

| Component | Mole Fraction | Flow Rate (kmoles/h) |
| --- | --- | --- |
| $N_2$ | 0.1454 | 56.6 |
| Ar | 0.0054 | 2.1 |
| $CO_2$ | 0.0263 | 10.3 |
| $CH_4$ | 0.0612 | 23.9 |
| CO | 0.2625 | 102.3 |
| $H_2$ | 0.4992 | 194.5 |

TABLE 9

| Component | Mole Fraction | Flow Rate (kmoles/h) |
| --- | --- | --- |
| $N_2$ | 0.1454 | 79.4 |
| Ar | 0.0054 | 2.9 |
| $CO_2$ | 0.0263 | 14.3 |
| $CH_4$ | 0.0612 | 33.5 |
| CO | 0.2625 | 143.5 |
| $H_2$ | 0.4992 | 272.9 |

The overall hydrogen recovery of the system increased to 93.9% with tail gas recycled to the PSA. Also the capacity of the adsorber vessel for fresh feed unexpectedly increased even though more gas (i.e. compressed PSA tail gas) is added to the feed end of the vessels during the eq1d and eq2d steps. The overall compression requirement increased to 936.2 kmole/hr compared to 855.6 kmole/h for example 1. The higher hydrogen recovery reduced the overall feed to the PSA unit by 7.2% (vs. example 1) for the same $H_2$ production rate, thus decreasing the demand on the hydrogen generation reactor and improving the overall plant efficiency.

Example 3

The PSA cycle for example 3 is represented by FIGS. 16a and 16b, where PSA tail gas is recycled to adsorption beds undergoing eq1d and eq2d, but not eq3d or eq4d. For example 3, a portion of the PSA tail gas from PSA 410 is used as fuel 425, a portion 435 is compressed in compressor 420 and recycled to the hydrogen generator 400 and another portion 445 is compressed and recycled to the PSA as shown in FIG. 22.

Stream compositions and flow rates for PSA feed stream 405 are summarized in Table 10. Stream compositions and flow rates for hydrogen product stream 415 are summarized in Table 11. Stream compositions and flow rates for fuel stream 425 are summarized in Table 12. Stream compositions and flow rates for PSA tail gas stream 435 recycled to hydrogen generator 400 are summarized in Table 13. Stream compositions and flow rates for PSA tail gas stream 445 recycled to the PSA system in beds undergoing eq1d and eq2d are summarized in Table 14.

TABLE 10

| Component | Mole Fraction | Flow Rate (kmoles/h) |
| --- | --- | --- |
| $N_2$ | 0.0191 | 105.4 |
| Ar | 0.0012 | 6.7 |
| $CO_2$ | 0.0030 | 16.6 |
| $CH_4$ | 0.0071 | 38.9 |
| CO | 0.0302 | 166.7 |
| $H_2$ | 0.9394 | 5177.0 |

TABLE 11

| Component | Mole Fraction | Flow Rate (kmoles/h) |
| --- | --- | --- |
| $N_2$ | 28 ppm | 0.1 |
| Ar | 674 ppm | 3.2 |
| $CO_2$ | 0 | 0.0 |
| $CH_4$ | 0 | 0.0 |
| CO | 0 | 0.0 |
| $H_2$ | 0.9993 | 4778.4 |

TABLE 12

| Component | Mole Fraction | Flow Rate (kmoles/h) |
| --- | --- | --- |
| $N_2$ | 0.1443 | 34.2 |
| Ar | 0.0048 | 1.1 |
| $CO_2$ | 0.0228 | 5.4 |
| $CH_4$ | 0.0534 | 12.7 |
| CO | 0.2284 | 54.2 |
| $H_2$ | 0.5464 | 129.5 |

TABLE 13

| Component | Mole Fraction | Flow Rate (kmoles/h) |
| --- | --- | --- |
| $N_2$ | 0.1443 | 71.0 |
| Ar | 0.0047 | 2.3 |
| $CO_2$ | 0.0228 | 11.2 |
| $CH_4$ | 0.0533 | 26.3 |
| CO | 0.2284 | 112.5 |
| $H_2$ | 0.5464 | 269.1 |

TABLE 14

| Component | Mole Fraction | Flow Rate (kmoles/h) |
| --- | --- | --- |
| $N_2$ | 0.1443 | 97.7 |
| Ar | 0.0047 | 3.2 |
| $CO_2$ | 0.0228 | 15.5 |
| $CH_4$ | 0.0533 | 36.1 |
| CO | 0.2285 | 154.8 |
| $H_2$ | 0.5465 | 370.3 |

The overall hydrogen recovery of the system increased to 92.39% with tail gas recycled to the PSA during the eq1d and eq2d steps. Also the capacity of the adsorber vessel for fresh feed unexpectedly increased even though more gas (i.e. compressed PSA tail gas) is added to the feed end of the vessels during the eq1d and eq2d steps. The vessel size for the PSA decreases for the same hydrogen production rate. The higher hydrogen recovery reduced the overall feed to the PSA unit by 5.6% (vs. example 1) for the same $H_2$ production rate, thus decreasing the demand on the $H_2$ generation reactor and improving plant efficiency.

We claim:

1. A hydrogen production process comprising:
    introducing reactants comprising steam and a hydrocarbon feed into a first reactor wherein the hydrocarbon feed comprises methane and at least one C2-C5 hydrocarbon, reacting the reactants in the presence of a reforming catalyst under reaction conditions sufficient to form a reformate comprising $H_2$, CO, and unreacted methane and steam, and withdrawing the reformate from the first reactor, wherein the reaction conditions sufficient to form the reformate include a temperature ranging from 430° C. to 570° C., and a pressure ranging from 0.7 to 9 MPa;
    introducing an oxygen-containing stream and the reformate from the first reactor into a second reactor, reacting the oxygen and the reformate in the presence of a second reforming catalyst under reaction conditions sufficient to form additional $H_2$ and CO in the reformate, wherein the reformate from the first reactor is not further reacted before being introduced into the second reactor;
    recovering heat from the reformate from the second reactor thereby cooling the reformate;
    reacting the cooled reformate in the presence of a shift catalyst under reaction conditions sufficient to shift the reformate to form additional $H_2$ in the reformate;
    recovering heat from the shifted reformate thereby cooling the shifted reformate;
    removing $H_2O$ from the shifted reformate to form a water-depleted reformate;
    separating the water-depleted reformate into a $CO_2$ product stream and a pressure swing adsorber feed stream comprising $H_2$ and secondary gas components, the secondary gas components comprising CO, $N_2$, Ar, and $CH_4$;
    separating the pressure swing adsorber feed stream in a plurality of at least 4 pressure swing adsorption beds, each adsorption bed containing an adsorbent selective for the secondary gas components thereby forming a $H_2$ product stream and a pressure swing adsorption tail gas stream;
    introducing a first portion of the tail gas stream into at least one of the first reactor, and the second reactor; and
    introducing a second portion of the tail gas stream into at least one of the plurality of pressure swing adsorption beds.

2. The process of claim 1 wherein the molar flow rate of the first portion of the tail gas stream is 15% to 80% of the molar flow rate of the tail gas stream.

3. The process of claim 1 wherein the molar flow rate of the second portion of the tail gas stream is 5% to 80% of the molar flow rate of the tail gas stream.

4. The process of claim 1 wherein a third portion of the tail gas stream is combusted in a boiler thereby forming combustion products and generating heat for forming a portion of the steam in the reactants from feed water, the portion of the steam formed by indirect heat exchange between the feed water and the combustion products.

5. The process of claim 4 wherein the molar flow rate of the third portion of the tail gas stream is 1% to 25% of the molar flow rate of the tail gas stream.

6. The process of claim 1 wherein the step of recovering heat from the reformate from the second reactor comprises heating the reformate from the first reactor by indirect heat exchange between the reformate from the first reactor and the reformate from the second reactor prior to introducing the reformate from the first reactor into the second reactor.

7. The process of claim 1 wherein the step of recovering heat from the reformate from the second reactor comprises heating a hydrocarbon feedstock by indirect heat exchange, wherein the hydrocarbon feed is formed from the heated hydrocarbon feedstock.

8. The process of claim 1 wherein a portion of the steam in the reactants is generated in the step of recovering heat from the reformate from the second reactor, the portion of the steam formed from feed water, the portion of the steam formed by indirect heat exchange between the feed water and the reformate from the second reactor.

9. The process of claim 1 wherein a portion of the steam in the reactants is generated by direct heat transfer between the hydrocarbon feed and feed water and the step of recovering heat from the reformate from the second reactor comprises heating the reactants by indirect heat exchange with the reformate from the second reactor prior to introducing the reactants into the first reactor.

10. The process of claim 1 wherein the water-depleted reformate is separated by liquid absorption.

11. The process of claim 1 wherein the water-depleted reformate is separated by pressure swing adsorption.

12. The process of claim 1 wherein the step of separating the pressure swing adsorber feed stream comprises subjecting each of the plurality of adsorption beds to a repetitive cycle, the repetitive cycle comprising, in sequence, a feed step, a first pressure decreasing equalization step, a provide purge step, a blowdown step, a purge step, a first pressure increasing equalization step, and a repressurization step, wherein:
    the feed step comprises introducing the pressure swing adsorber feed stream at a feed pressure ranging from 1.0 MPa to 7.0 MPa into an adsorption bed undergoing the feed step and adsorbing the secondary gas components on the adsorbent in the adsorption bed undergoing the feed step while simultaneously withdrawing the $H_2$ product stream from the adsorption bed undergoing the feed step;
    the first pressure decreasing equalization step comprises co-currently withdrawing a pressure equalization gas from an adsorption bed undergoing the first pressure decreasing equalization step, and passing the pressure equalization gas to an adsorption bed undergoing the first pressure increasing equalization step thereby equalizing the pressure between the adsorption bed undergoing the first pressure decreasing equalization step and the adsorption bed undergoing the first pressure increasing equalization step;
    the provide purge step comprises co-currently withdrawing a purge gas from an adsorption bed undergoing the provide purge step, and passing the purge gas from the adsorption bed undergoing the provide purge step to an adsorption bed undergoing the purge step;
    the blowdown step comprises counter-currently withdrawing a blowdown gas from an adsorption bed undergoing the blowdown step, the blowdown gas having a concentration of the secondary gas components that is higher than the concentration of the secondary gas components in the feed gas mixture;

the purge step comprises counter-currently introducing the purge gas from the adsorption bed undergoing the provide purge step, into an adsorption bed undergoing the purge step and counter-currently withdrawing a purge gas effluent from the adsorption bed undergoing the purge step, the purge gas effluent having a concentration of the secondary gas components that is higher than the concentration of the secondary gas components in the feed gas mixture;

the first pressure increasing equalization step comprises counter-currently introducing the pressure equalization gas from the adsorption bed undergoing the first pressure decreasing equalization step into the adsorption bed undergoing the first pressure increasing equalization step; and the repressurization step comprises increasing the pressure in an adsorption bed undergoing the repressurization step until the adsorption bed undergoing the repressurization step is substantially at the feed gas pressure, by at least one of (i) co-currently introducing the feed gas mixture into the adsorption bed undergoing the repressurization step, and (ii) counter-currently introducing a portion of the product gas from the adsorption bed undergoing the feed step into the adsorption bed undergoing the repressurization step;

wherein the tail gas stream comprises the blowdown gas and the purge gas effluent.

13. The process of claim 12 wherein the step of introducing the second portion of the tail gas stream comprises co-currently introducing the second portion of the tail gas stream into a pressure swing adsorption bed undergoing the feed step.

14. The process of claim 12 wherein the step of introducing the second portion of the tail gas stream comprises co-currently introducing the second portion of the tail gas stream into a pressure swing adsorption bed undergoing the first pressure decreasing equalization step simultaneously with the withdrawing of the pressure equalization gas.

15. The process of claim 12 wherein the step of introducing the second portion of the tail gas stream comprises co-currently introducing the second portion of the tail gas stream into a pressure swing adsorption bed undergoing the provide purge step simultaneously with the withdrawing of the purge gas.

16. The process of claim 12 wherein the repetitive cycle further comprises a rinse step, wherein the rinse step is after the feed step and before the first pressure decreasing equalization step in the repetitive cycle, wherein the step of introducing the second portion of the tail gas stream comprises co-currently introducing the second portion of the tail gas stream into a pressure swing adsorption bed undergoing the rinse step while simultaneously co-currently withdrawing a rinse gas effluent from the adsorption bed undergoing the rinse step.

* * * * *